United States Patent
Wong et al.

(10) Patent No.: US 10,460,616 B2
(45) Date of Patent: *Oct. 29, 2019

(54) METHOD AND SYSTEM FOR ACTIVE LEARNING

(71) Applicant: Active Learning Solutions Holdings Limited, Tortola (VG)

(72) Inventors: Howard Hing Hoi Wong, Hong Kong (HK); Kevin Kam Wo Mak, Hong Kong (HK)

(73) Assignee: Active Learning Solutions Holdings Limited, Tortola (VG)

( * ) Notice: Subject to any disclaimer, the term of this patent is extended or adjusted under 35 U.S.C. 154(b) by 337 days.

This patent is subject to a terminal disclaimer.

(21) Appl. No.: 15/389,435

(22) Filed: Dec. 22, 2016

(65) Prior Publication Data
US 2017/0103664 A1 Apr. 13, 2017

Related U.S. Application Data

(63) Continuation-in-part of application No. 13/685,720, filed on Nov. 27, 2012, now abandoned.

(51) Int. Cl.
| | |
|---|---|
| *G09B 5/06* | (2006.01) |
| *G09B 7/07* | (2006.01) |
| *G09B 7/00* | (2006.01) |
| *H04W 4/02* | (2018.01) |

(52) U.S. Cl.
CPC .............. *G09B 5/065* (2013.01); *G09B 7/00* (2013.01); *G09B 7/07* (2013.01); *H04W 4/023* (2013.01)

(58) Field of Classification Search
CPC ....... G06F 3/017; G06F 3/0325; G06F 3/0304
See application file for complete search history.

(56) References Cited

U.S. PATENT DOCUMENTS

| | | | | |
|---|---|---|---|---|
| 3,936,109 A | * | 2/1976 | Richardson ............ | A47B 19/08 312/223.5 |
| 5,767,897 A | * | 6/1998 | Howell ................... | H04N 7/15 348/14.07 |
| 5,850,250 A | * | 12/1998 | Konopka ................ | G09B 5/00 348/14.07 |

(Continued)

*Primary Examiner* — Robert J Utama
(74) *Attorney, Agent, or Firm* — Idea Intellectual Limited; Margaret A. Burke; Sam T. Yip

(57) ABSTRACT

A method and system for conducting interactive classroom learning that can utilize a plurality of electronic audio and video equipment, mobile computing devices, and processing servers, interconnected via a first network infrastructure in a classroom or presentation hall to deliver seamlessly interactive multimedia contents to each of one or more participants in classroom or presentation hall; wherein the participants comprises one or more lecturers or presenters, and one or more students or audiences. The method and system allow the control and coordination of the electronic audio and video equipment, mobile computing devices, and the processing servers to deliver the interactive multimedia contents to the participants in the classroom or presentation hall simultaneously and to facilitate the information input-output interactions to and from the participants; wherein the interactive multimedia contents can be divided into multiple parts or streams, and each being personalized for each or each subset of the participants.

11 Claims, 12 Drawing Sheets

(56) References Cited

U.S. PATENT DOCUMENTS

| | | | | |
|---|---|---|---|---|
| 6,091,408 A * | 7/2000 | Treibitz | G06F 3/033 | 715/753 |
| 6,219,086 B1 * | 4/2001 | Murata | H04N 7/142 | 348/E7.079 |
| 6,654,785 B1 * | 11/2003 | Craig | G06F 16/954 | 709/203 |
| 7,290,204 B1 * | 10/2007 | Kanno | G06F 16/954 | 715/205 |
| 7,428,000 B2 * | 9/2008 | Cutler | H04N 7/15 | 348/14.08 |
| 7,714,802 B2 * | 5/2010 | Hurley | G09G 5/00 | 345/2.1 |
| 8,064,817 B1 * | 11/2011 | Ziv-El | G09B 7/00 | 345/156 |
| 8,520,674 B2 * | 8/2013 | Samuels | G08B 13/19656 | 370/390 |
| 2002/0116462 A1 * | 8/2002 | DiGiano | G09B 7/02 | 709/205 |
| 2002/0188656 A1 * | 12/2002 | Patton | H04B 10/1149 | 709/201 |
| 2003/0073065 A1 * | 4/2003 | Riggs | G09B 5/00 | 434/350 |
| 2004/0004634 A1 * | 1/2004 | Li | G09B 5/06 | 715/733 |
| 2004/0030781 A1 * | 2/2004 | Etesse | G06Q 30/06 | 709/225 |
| 2005/0277102 A1 * | 12/2005 | Gillette | G09B 5/00 | 434/350 |
| 2006/0294552 A1 * | 12/2006 | Swanson | G06Q 30/02 | 725/80 |
| 2007/0020603 A1 * | 1/2007 | Woulfe | G09B 5/08 | 434/350 |
| 2007/0200922 A1 * | 8/2007 | Ueno | H04N 7/15 | 348/14.08 |
| 2007/0273751 A1 * | 11/2007 | Sachau | H04N 7/14 | 348/14.02 |
| 2008/0125119 A1 * | 5/2008 | Corritore | G06Q 10/02 | 455/435.1 |
| 2008/0209330 A1 * | 8/2008 | Cruver | H04L 12/1831 | 715/733 |
| 2009/0083638 A1 * | 3/2009 | Gupta | G06Q 50/205 | 715/752 |
| 2009/0148824 A1 * | 6/2009 | Argott | G09B 5/08 | 434/307 R |
| 2010/0112540 A1 * | 5/2010 | Gross | G09B 5/10 | 434/351 |
| 2010/0125625 A1 * | 5/2010 | Oliver | H04M 3/38 | 709/203 |
| 2010/0299390 A1 * | 11/2010 | Alameh | G06F 3/017 | 709/204 |
| 2011/0225494 A1 * | 9/2011 | Shmuylovich | G06F 3/04883 | 715/705 |
| 2012/0182384 A1 * | 7/2012 | Anderson | H04L 12/1827 | 348/14.09 |
| 2012/0206566 A1 * | 8/2012 | Fedoseyeva | G06Q 10/06398 | 348/38 |
| 2012/0231434 A1 * | 9/2012 | Standage | G09B 5/06 | 434/350 |
| 2013/0082953 A1 * | 4/2013 | Yoshizawa | G06F 3/0488 | 345/173 |
| 2013/0091409 A1 * | 4/2013 | Jeffery | G06F 16/4393 | 715/202 |
| 2013/0132852 A1 * | 5/2013 | Sommer | G06Q 10/103 | 715/736 |
| 2013/0316322 A1 * | 11/2013 | Roschelle | G09B 7/00 | 434/350 |
| 2013/0344469 A1 * | 12/2013 | Abrahamson | G09B 5/00 | 434/350 |
| 2014/0004497 A1 * | 1/2014 | Wong | G09B 7/00 | 434/350 |
| 2014/0045162 A1 * | 2/2014 | Ando | G09B 5/00 | 434/322 |
| 2014/0089799 A1 * | 3/2014 | Evans | G06K 19/06009 | 715/716 |
| 2014/0092242 A1 * | 4/2014 | Krishnan | G06K 9/00771 | 348/143 |

* cited by examiner

METHOD AND SYSTEM FOR ACTIVE LEARNING

CROSS-REFERENCE WITH RELATED APPLICATIONS

This application is a Continuation-in-part application of the U.S. Non-provisional Utility patent application Ser. No. 13/685,720, filed Nov. 27, 2012, and the disclosure of which is incorporated herein by reference in its entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent Office patent file or records, but otherwise reserves all copyright rights whatsoever.

FIELD OF THE INVENTION

The present invention relates generally to classroom information technology. Particularly, the present invention relates to methods and systems of classroom learning and presentation of lecture materials. More particularly, the present invention relates to the interactive classroom learning methods and systems using a network of coordinated electronic devices for presenting the lecture materials and facilitating the lecturer's and students' participation.

BACKGROUND

Traditionally, the use of information technology in classrooms and presentation halls is limited to ad hoc fashions. Often it merely involves the display of presentation slides or videos using an overhead projector or large video display monitor and an integrated sound system. Better-equipped classrooms or presentation halls would provide wireless network infrastructures for Internet connection and intra-room networking capability for the participants to be interconnected using their own mobile computing devices. Still more advanced classrooms or presentation halls would allow interactive lecture or presentation material contents to be accessed by the connected mobile computing devices, complimenting the lecture or presentation in progress.

However, there has not been any system that can deliver a seamless interactive lecture or presentation experience to the participants through the use of a plurality of information technology equipment of various types. For instance, while most arrangements of information technology equipment are capable of simultaneously delivering non-interactive contents through an overhead projector, the sound system, and perhaps to the participants' individual mobile computing devices by video-streaming via wireless network; no existing system can deliver interactive contents comprising many different tracks to different equipment such that the content being displayed by the overhead projector can be different from the content being video-streamed to the participants' individual mobile computing devices, and yet the playback of each of the different track of interactive contents being real-time synchronized and controllable by the lecturer or presenter.

Another shortcoming of currently available systems is that the initial setup for delivering the lecture or presentation material contents to a range of different information technology equipment can be burdensome and time consuming, degrading the overall participants' experience of the lecture or presentation. For instance, the connection of each participant's mobile computing device to the classroom's or presentation hall's network infrastructure for content access can involve software and hardware network configurations, the device's and the participant's authentication and authorization. This process is prone to human errors and it must be carried out by each participant.

Currently available systems also do not deliver a comprehensive learning experience without constant network connectivity. Once the participant leaves the classroom's or presentation hall's network infrastructure, the interactive lecture or presentation experience stops. As such, most of these currently available systems are limited to facilitating online activities without the capability to account for offline activities. They are also limited in their capability in tracking and assessing the learning progress of students throughout a multi-module program and they do not integrate education with other life aspects of the participant.

SUMMARY

It is an objective of the presently claimed invention to provide a method and system for conducting interactive classroom learning that can utilize a plurality of electronic audio and video equipment, mobile computing devices, and processing servers, interconnected via a network infrastructure in a classroom or presentation hall to deliver seamlessly interactive multimedia contents to each of one or more participants in classroom or presentation hall; wherein the participants comprises one or more lecturers or presenters, and one or more students or audiences.

It is a further objective of the presently claimed invention to provide a number of interactive lectures and curriculums based on the aforementioned method and system for conducting interactive classroom learning. The goals of building the interactive lectures and curriculums include:

(a) enhancing students' interest in learning different skills such as language skills (e.g., speaking, writing, listening), mathematical skills (e.g., basic concept of decimals and unit conversion for capacity and volume), coordination of different parts of their body, IT skills (e.g., computer graphic manipulation), specific subjects (e.g. navigation skills, human anatomy and physiology, visual art), etc.;
(b) enhancing classroom management;
(c) encouraging students' participation in the class;
(d) facilitating lesson preparation;
(e) enabling real-time assessment and comparison of students' academic and learning performance; and
(f) replacing conventional teaching tools by virtual platform.

One aspect of the presently claimed invention is the method and system used to control and coordinate the electronic audio and video equipment, mobile computing devices, and the processing servers to deliver the interactive multimedia contents to one or more of the participants in the classroom or presentation hall simultaneously and to facilitate the information input-output interactions to and from the participants; wherein the interactive multimedia contents can be divided into multiple parts or streams, and each being personalized for each or each subset of the participants.

Another aspect of the presently claimed invention is the rapid and highly automated participant authentication and network connectivity setup for new participants with their mobile computing devices joining the first network infrastructure in the classroom or presentation hall.

Still another aspect of the presently claimed invention is allowing the first network infrastructure to facilitate the simultaneous streaming of multiple parts or streams of the interactive multimedia contents to the electronic audio and video equipment and mobile computing devices with a network latency of no more than 500 milliseconds, enabling a real-time synchronized interactive lecture or presentation experience among the plurality of participants in the classroom or presentation hall.

In accordance with various embodiments, the presently claimed invention comprises a first processing server for one or more classrooms or presentation halls; a mobile computing device for each of one or more participants in each of the classrooms or presentation halls, wherein the mobile computing devices can be tablet computers, laptop computers, Netbook computers, and/or combinations thereof; and optionally one or more electronic audio and video equipment in each of the classrooms or presentation halls, wherein the electronic audio and video equipment can be overhead projectors, electronic video displays, sound amplifying systems, and/or combinations thereof. In accordance with one embodiment, the first processing server, the mobile computing devices, and the electronic audio and video equipment are interconnected via the first network infrastructure, wherein the first network infrastructure can be a local area wired, wireless, or a combination of wired and wireless network. In the case of local area wired network, the first network infrastructure includes a router; and in the case of local area wireless network, the first network infrastructure includes a network access point.

In accordance with various embodiments, the first processing server is configured to exchange data with the mobile computing devices, wherein the data includes participants input and parts or streams of the interactive multimedia contents. The first processing server is also configured to allow participant control of the electronic audio and video equipment using one of the mobile computing devices and feed parts or streams of the interactive multimedia contents to the electronic audio and video equipment. The first processing server is also configured to control the first network infrastructure via the network access point or router, adjust and/or segment its connectivity coverage area, enable and disable network connections of and networked resource accesses by the mobile computing devices. In accordance with one embodiment, the first processing server also comprises a data repository for storage of participant information, the interactive multimedia contents, and lecture or presentation materials. In accordance with another embodiment, the first processing server communicates with a second processing server for data retrieval and storage via a second network infrastructure, wherein the second process server comprises a data repository for storage of participant information, the interactive multimedia contents, and lecture or presentation materials.

In accordance with various embodiments, the mobile computing devices are grouped into at least two groups: a lecturer or presenter group, and a student or audience group. Mobile computing devices in the lecturer or presenter group are configured to interact with the first processing server to achieve the following functions:

1. Control and monitor the functions and status, including power on/off, sleep mode on/off, volume, and general conditions, of the electronic audio and video equipment;
2. Control and monitor the display, speaker, other functions and status, including power on/off, sleep mode on/off, interactive multimedia contents playback, access authorization to data in the first processing server, network resource access, network connectivity, volume, storage capacity, battery level, and general device conditions, of each of the mobile computing devices in the student or audience group;
3. Control and monitor the functions and status of the first network infrastructure, including connectivity coverage area segmentation, network connections and networked resource access authorization for the mobile computing devices; and
4. Control the delivery of the interactive multimedia contents and lecture or presentation materials to each or subset of the electronic audio and video equipment and each or subset of mobile computing devices, wherein the parts or streams of the interactive multimedia contents and lecture or presentation materials can be different for each or subset of the electronic audio and video equipment and each or subset of mobile computing devices according to a pre-configured setting for the particular interactive multimedia contents or participant control input from the mobile computing devices in the lecturer or presenter group.

In accordance with various embodiments, each of the mobile computing devices in the lecturer or presenter group are configured to allow communication with each of the mobile computing devices in the student or audience group, wherein the communication can be text and/or graphical based. In accordance with various embodiments, each of the mobile computing devices is configured to be able to access the first processing server for viewing the lecture or presentation materials. In addition, each of the mobile computing devices is configured to receive participant's answers to materials displayed that require user input from the participant. The participant's input data is then sent to the first processing server for storage and can be viewed from the other mobile computing devices.

In accordance with an alternative embodiment, the active learning system is implemented on Cloud computing platform that includes a Cloud computing processing server or a cluster of one or more Cloud computing processing servers configured to allow connections to the mobile computing devices. The Cloud computing processing server or the cluster of Cloud computing processing servers can be remotely located outside of the classroom or presentation hall and are functional replacement of the first processing server. The video/audio equipment for output of the interactive multi-media contents can be connected to the Cloud computing processing server or the cluster of Cloud computing processing servers through an input/output device allowing the control by the presenter through his/her mobile computing device running a corresponding software program or mobile application.

In accordance with various embodiments, the Cloud computing based active learning system is configured to offer additional services in the form of paid contents and metered usage.

It is yet another aspect of the presently claimed invention to provide a mobile computing device that integrates with the Cloud computing based active learning system outside a classroom or a presentation hall and without the need of first registering the mobile computing device and joining the ALS infrastructure. Features of such mobile computing device include a resource tray in its graphical user interface. The resource tray functionalities include a quick access to reference materials and hyperlinks to related resources on the Internet and those residing in the Cloud computing processing server or the cluster of Cloud computing processing servers of the Cloud computing based active learning system.

It is yet another aspect of the presently claimed invention to provide such method and system for conducting interactive learning inside and outside of a classroom or presentation hall environment, even where the classroom's or presentation hall's network infrastructure is out of reach. In one embodiment, beacons (a class of Bluetooth low energy devices) technology is adopted such that mobile computing devices are not necessary in enabling the interactive learning experience beyond the reach of classroom's or presentation hall's network infrastructure. Certain beacon-based interactive lectures or curriculums are designed to use only beacons that are wearable on participants, installed at point of interests, or combinations thereof without the involvement of the participants' mobile computing devices.

BRIEF DESCRIPTION OF THE DRAWINGS

Embodiments of the invention are described in more detail hereinafter with reference to the drawings, in which.

DETAILED DESCRIPTION

In the following description, methods and systems of classroom interactive learning and presentation hall interactive presentation and the like are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1A:
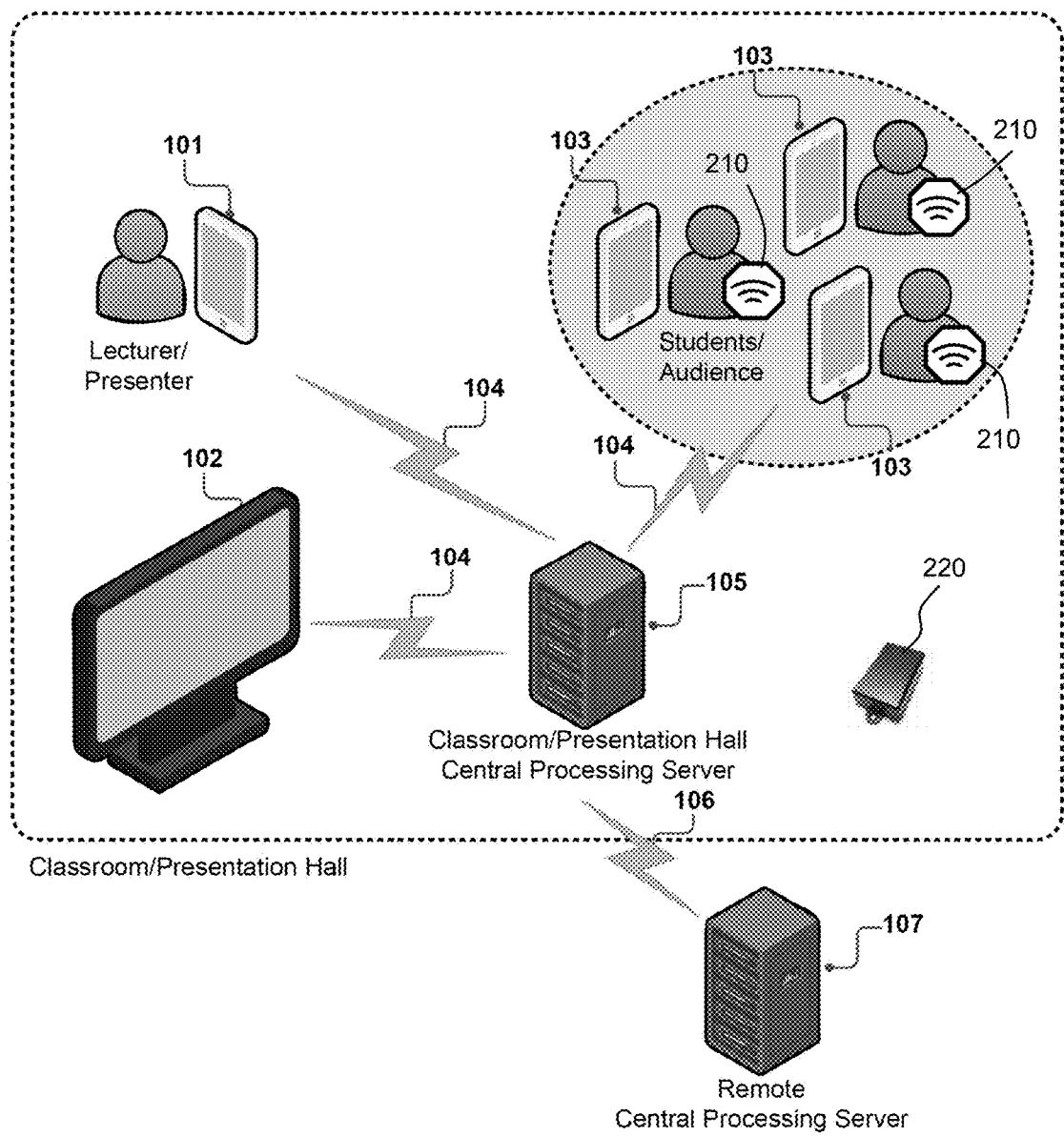
FIG. 1A shows a block diagram illustrating an exemplary embodiment of the presently claimed classroom interactive learning system.

Base System:

Referring to FIG. 1A. In accordance with various embodiments the presently claimed invention comprises a first processing server 105 for one or more classrooms or presentation halls; a specifically configured mobile computing device for each of participants in each of the classrooms or presentation halls (101 and 103); and optionally one or more network-capable electronic audio and video equipment 102 in each of the classrooms or presentation halls, wherein the electronic audio and video equipment can be overhead projectors, electronic video displays, sound amplifying systems, and/or combinations thereof. The first processing server 105, the mobile computing devices 101 and 103, and the electronic audio and video equipment 102 are interconnected via a first network infrastructure 104, forming an active learning solution (ALS) infrastructure for the classroom or presentation hall. The first network infrastructure 104 can be a local area wired, wireless, or a combination of wired and wireless network supporting the TCP/IP protocol. In the case of local area wired network, the first network infrastructure 104 includes a router; and in the case of local area wireless network, the first network can be based on Wi-Fi technology according to the various IEEE 802.11 standards and includes a network access point. The first network also includes network components providing anti-intrusion and access control functionalities.

In accordance with various embodiments, the first processing server 105 is configured to exchange data with the mobile computing devices 101 and 103, wherein the data includes user inputs and parts or streams of the interactive multimedia contents. The first processing server 105 is also configured to allow participant control of the electronic audio and video equipment 102 using one of the mobile computing devices and feed parts or streams of the interactive multimedia contents to the electronic audio and video equipment. The first processing server 105 is also configured to control the first network infrastructure via the network access point or router, adjusting and/or segmenting its connectivity coverage area, enabling and disabling network connections and networked resource accesses of the mobile computing devices. In accordance with one embodiment, the first processing server 105 also comprises a data repository for storage of participant information, the interactive multimedia contents, and other lecture or presentation materials. In accordance with another embodiment, the first processing server 105 communicates with a second processing server 107 for data retrieval and storage via a second network infrastructure 106, wherein the second processing server 107 comprises a data repository for storage of participant information, the interactive multimedia contents, and other lecture or presentation materials. The second network infrastructure 106 can be the first network infrastructure 104; a separate local area wired, wireless, or a combination of wired and wireless network supporting the TCP/IP protocol; a wide area communication network or a telecommunication network supporting the Internet protocols.

In accordance with various embodiments, the mobile computing devices 101 and 103 are grouped into at least two groups: a lecturer or presenter group, and a student or audience group. Mobile computing devices in the lecturer or presenter group (101) are configured to interact with the first processing server 105 to achieve the following functions:

1. Control and monitor the status, including power on/off, battery level, network connectivity, volume, and general conditions, of the electronic audio and video equipment;
2. Control and monitor the display, sound volume, power on/off, sleep mode on/off, interactive multimedia contents playback, access authorization to data in the first processing server, network resource access, network connectivity, storage capacity, battery level, and general device conditions, of each of the mobile computing devices in the student or audience group;
3. Control and monitor the first network, adjusting and/or segmenting its connectivity coverage area, enabling and disabling network connections and networked resource accesses of each or each subset of the mobile computing devices; and
4. Control the delivery of the interactive multimedia contents to each or subset of the electronic audio and video equipment and each or subset of the mobile computing devices, wherein the parts or streams of the interactive multimedia contents can be different for each or each subset of the electronic audio and video equipment and each or subset of the mobile computing devices according to a pre-configured setting for the particular interactive multimedia contents or participant control input from the mobile computing devices in the lecturer or presenter group.

In accordance with various embodiments, each of the mobile computing devices in the lecturer or presenter group (101) are configured to allow communication with each of the mobile computing devices in the student or audience group (103), wherein the communication can be textual and/or graphical. In accordance with various embodiments, each of the mobile computing devices 101 and 103 is configured to be able to access the first processing server 105 for viewing lecture or presentation and other reference materials. In addition, each of the mobile computing devices 101 and 103 is configured to receive participant's answers to materials displayed that require user input from the participant. The participant's input data is then sent to the first processing server 105 for storage and can be viewed from the other mobile computing devices 101 and 103.

In accordance to exemplary embodiments of the processing servers 105 and 107, the configuration of the processing servers 105 and 107 can be achieved by the installation and execution of specially designed server application software, which includes at least a user interface and server backend machine instruction codes.

Exemplary embodiments of the mobile computing devices 101 and 103 include tablet computers, laptop computers, Netbook computers, and/or combinations thereof that are wireless-networking enabled. The configuration of the mobile computing device 101 and 103 can be achieved by the installation and execution of specially designed application software, which includes at least a user interface and machine instruction codes. One exemplary embodiment of such application software installed in and executed by a tablet computer is a mobile application (App) running on the iOS operating system developed by Apple Inc. Another exemplary embodiment of such user interface is a mobile application (App) running on the Android operating system developed by Google Inc. In addition, various exemplary embodiments of the mobile computing devices include electronic components and circuitries for image capturing and near field communication (NFC). A NFC-enabled mobile computing device can retrieve data from a NFC-enabled device such as a NFC-enabled data storage or security access card.

Cloud Computing Based System:

In accordance with an alternative embodiment, the active learning system is implemented on Cloud computing platform that includes a Cloud computing processing server or a cluster of one or more Cloud computing processing servers configured to allow connections to the mobile computing devices. Details of the Cloud computing concept can be found in many documents, one of which is VOORSLUYS et al., Introduction to Cloud Computing, Cloud Computing: Principles and Paradigms, February 2011, pages 1-44, Wiley Press, New York, U.S.A.; the content of which is incorporated herein by reference in its entity. The Cloud computing processing server or the cluster of Cloud computing processing servers can be remotely located outside of the classroom or presentation hall and are functional replacement of the first processing server. The video/audio equipment for output of the interactive multi-media contents can be connected to the Cloud computing processing server or the cluster of Cloud computing processing servers through an input/output device allowing the control by the presenter through his/her mobile computing device running a corresponding software program or mobile application.

Figure 1B:
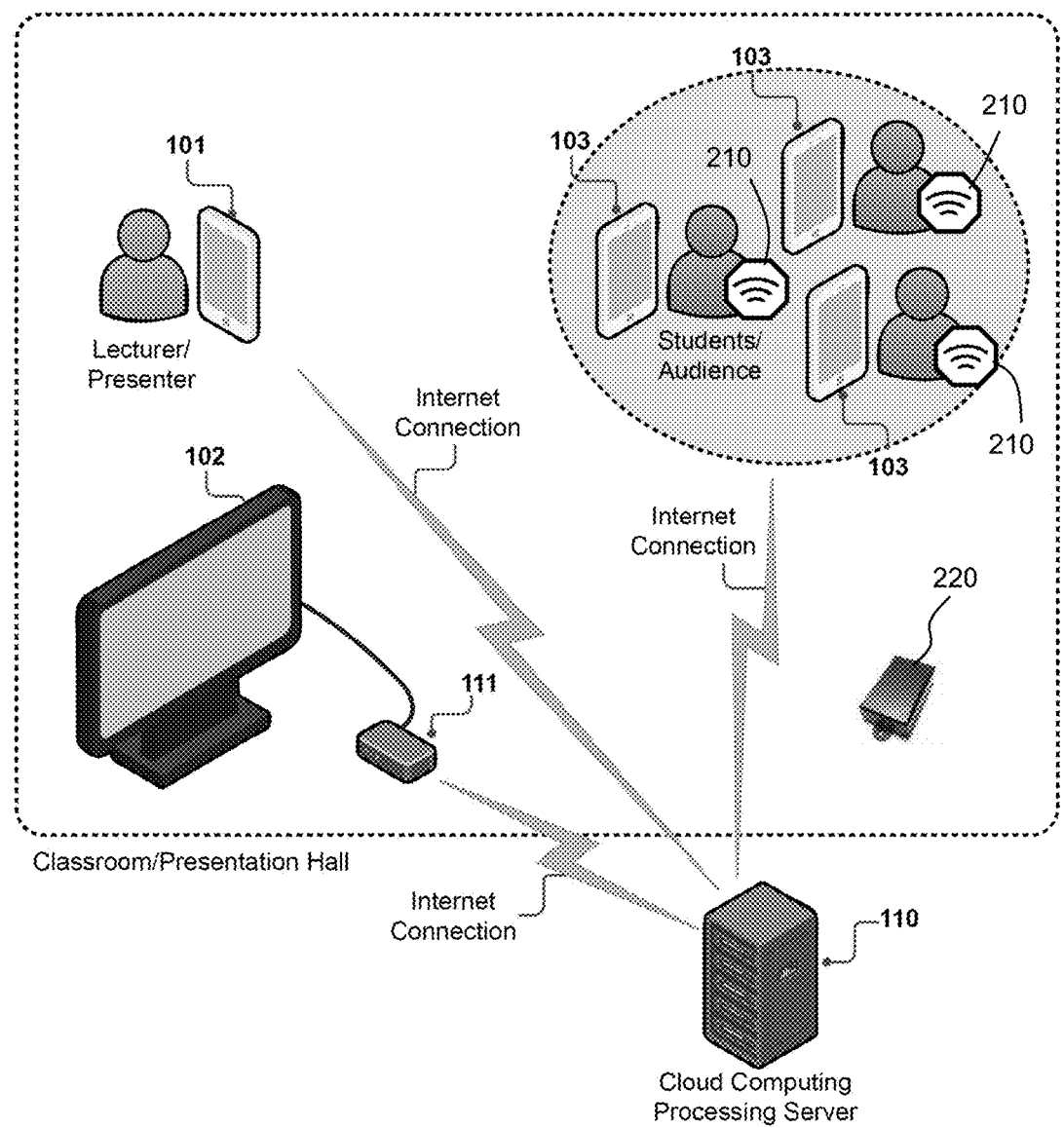
FIG. 1B shows a block diagram illustrating another exemplary embodiment of the presently claimed classroom interactive learning system implemented on Cloud computing platform.

Referring to FIG. 1B. In accordance with various embodiments the presently claimed invention comprises a Cloud computing processing server or a cluster of one or more Cloud computing processing servers (collectively referred to as Cloud computing processing server) 110 for one or more classrooms or presentation halls; a specifically configured mobile computing device for each of participants in each of the classrooms or presentation halls (101 and 103); and optionally one or more electronic audio and video equipment 102 in each of the classrooms or presentation halls, wherein the electronic audio and video equipment can be overhead projectors, electronic video displays, sound amplifying systems, and/or combinations thereof; and an input/output device 111 for connecting the electronic audio and video equipment. The Cloud computing processing server 110, the mobile computing devices 101 and 103, and the input/output device 111 are connected to the Internet, forming a Cloud computing based ALS infrastructure. The input/output device 111 provides Internet networked access and control capability to the electronic audio and video equipment.

The functionalities that are provided by the processing servers 105 and 107 in the non-Cloud computing based ALS infrastructure are then provided by the Cloud computing processing server 110. In one embodiment, the Cloud computing processing server 110 is to serve a plurality of classrooms or presentation halls belonging to different organizations/institutes. Portions or whole of the interactive multimedia contents, and lecture or presentation materials residing in the Cloud computing processing server 110 can be designated as paid contents, which are accessible on pay-per-use or paid subscription basis. Optionally, the Cloud computing based ALS infrastructure can be configured as metered pay-per-use, paid subscription, or per-user-licensing service.

Figure 2:
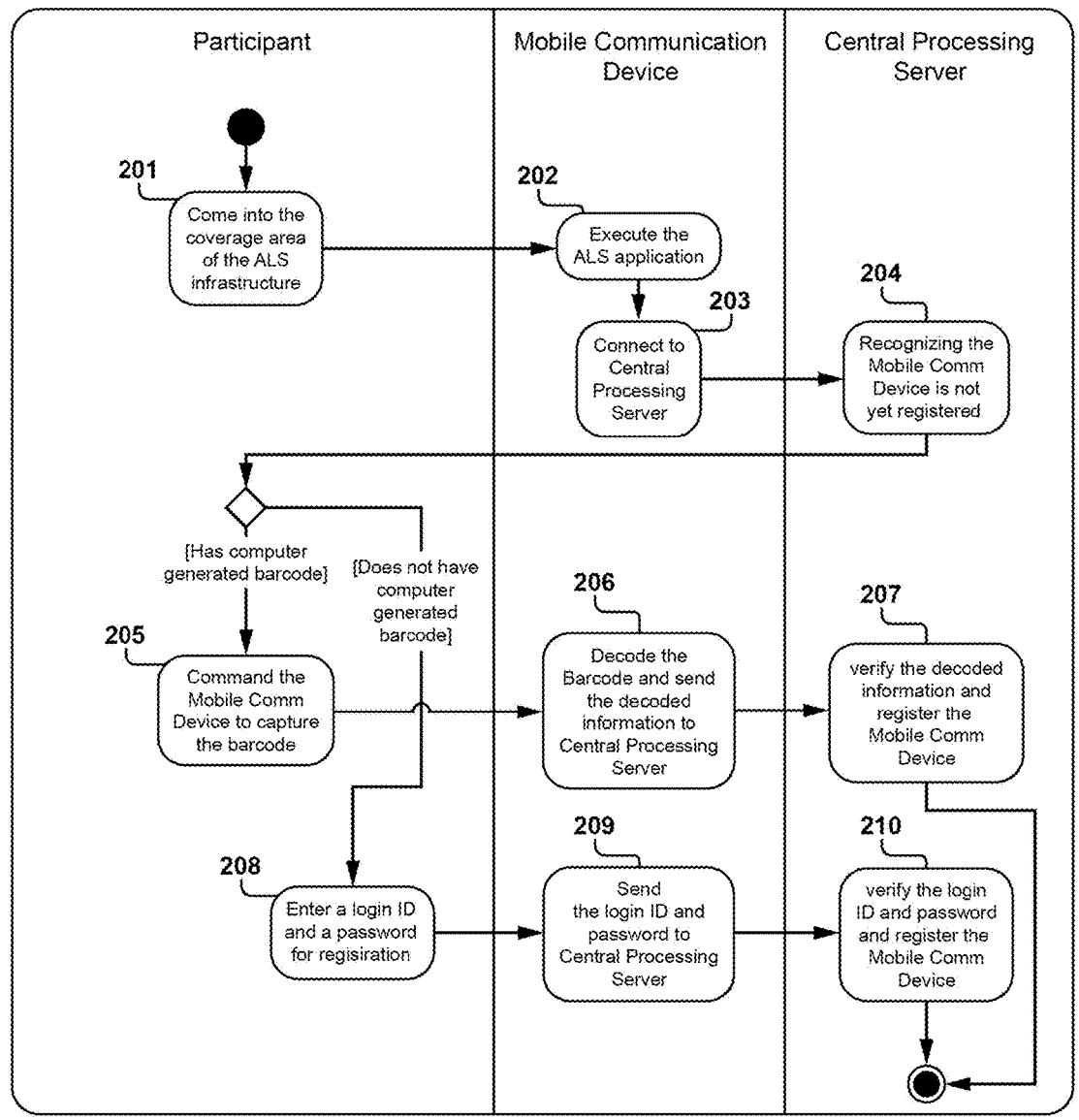
FIG. 2 shows a flow diagram of a device registration process in accordance to an embodiment of the presently claimed classroom interactive learning system.

Registering a New Mobile Computing Device in the ALS Infrastructure of the Classroom or Presentation Hall:

Referring to FIG. 2. A mobile computing device that has not previously been registered with a particular ALS infrastructure of a classroom or presentation hall must first be registered with the ALS infrastructure before joining it. The registration of a mobile computing device with an ALS infrastructure comprises: 201.) the mobile computing device entering the coverage area of the ALS infrastructure; 202.) launching and executing an ALS application in the mobile computing device; 203.) the mobile computing device connecting to the ALS infrastructure; 204.) a first processing server in the ALS infrastructure recognizing the mobile computing device is not yet registered and instructing the mobile computing device to prompt its user for registration; 205.) if the user of the mobile computing device has a computer-generated barcode, the user can command the mobile computing device to perform an image capture of the computer-generated barcode, wherein the computer-generated barcode can be a matrix or two-dimensional barcode such as a Quick Response (QR) code, and wherein the computer-generated barcode contains encoded information on the identity of the participant and the mobile computing device; 206.) the mobile computing device decoding the computer-generated barcode and sending the decoded information of the computer-generated barcode to the first processing server for verification; 207.) upon a positive verification, the mobile computing device is registered; 208.) if the user of the mobile computing device does not have a computer-generated barcode, the user can enter a login ID and a password for registration in a user interface of the ALS application running in the mobile computing device; 209.) the mobile computing device sending the login ID and password to first processing server for verification; 210.) upon a positive verification, the mobile computing device is registered.

Connecting a Mobile Computing Device to the ALS Infrastructure of the Classroom or Presentation Hall:

In order to access the networked resources, participate in an interactive lecture or presentation session, and view the interactive multimedia contents of an ALS infrastructure of a classroom or presentation hall, a participant must first authenticate and have his/her registered mobile computing device join the ALS infrastructure. In accordance to various embodiments, participants are divided into two groups: lecturer or presenter group and student or audience group. The processes of participant authentication and joining of a mobile computing device to an ALS infrastructure are different for these two groups of participants.

Figure 3A:
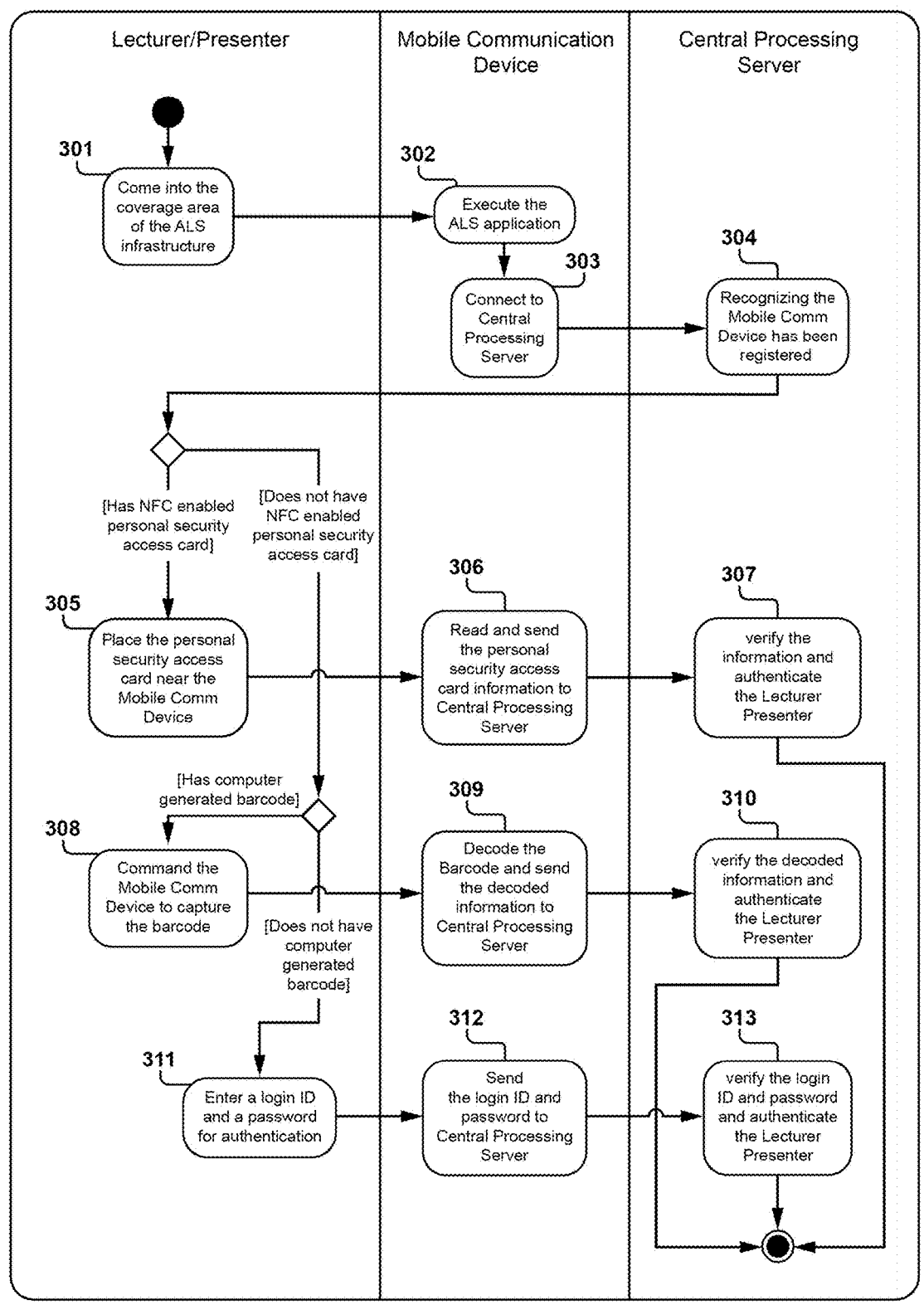
FIG. 3A and FIG. 3B show the flow diagrams of a participant authentication process in accordance to an embodiment of the presently claimed classroom interactive learning system.

Referring to FIG. 3A. The participant authentication and joining of a mobile computing device to an ALS infrastructure for a participant in the lecturer or presenter group comprises: 301.) the mobile computing device entering the coverage area of the ALS infrastructure; 302.) launching and executing the ALS application in the mobile computing device; 303.) the mobile computing device connecting to the ALS infrastructure; 304.) a first processing server in the ALS infrastructure recognizing the mobile computing device has been registered and instructing the mobile computing device to prompt its participant for authentication; 305.) if the participant of the mobile computing device has a NFC-enabled personal security access card, the participant can motion the personal security access card near the mobile computing device for the mobile computing device to retrieve the participant's personal security access information from the personal security access card; 306.) the mobile computing device sending the participant's personal security access information to the first processing server for authentication; 307.) upon a positive authentication, the mobile computing device joins the ALS infrastructure; 308.) if the participant of the mobile computing device has a computer-generated barcode, the participant can command the mobile computing device to perform an image capture of the computer-generated barcode, wherein the computer-generated barcode can be a matrix or two-dimensional barcode such as a Quick Response (QR) code and wherein the computer-generated barcode contains encoded information on the identity of the participant and the mobile computing device; 309.) the mobile computing device decoding the computer-generated barcode and sending the decoded information of the computer-generated barcode to the first processing server for authentication; 310.) upon a positive authentication, the mobile computing device joins the ALS infrastructure; 311.) if the participant of the mobile computing device does not have a NFC-enabled security access card or a computer-generated barcode, the participant can enter a login ID and a password for authentication in the ALS application user interface running in the mobile computing device; 312.) the mobile computing device sending the login ID and password to first processing server for authentication; 313.) upon a positive authentication, the mobile computing device joins the ALS infrastructure.

Figure 3B:
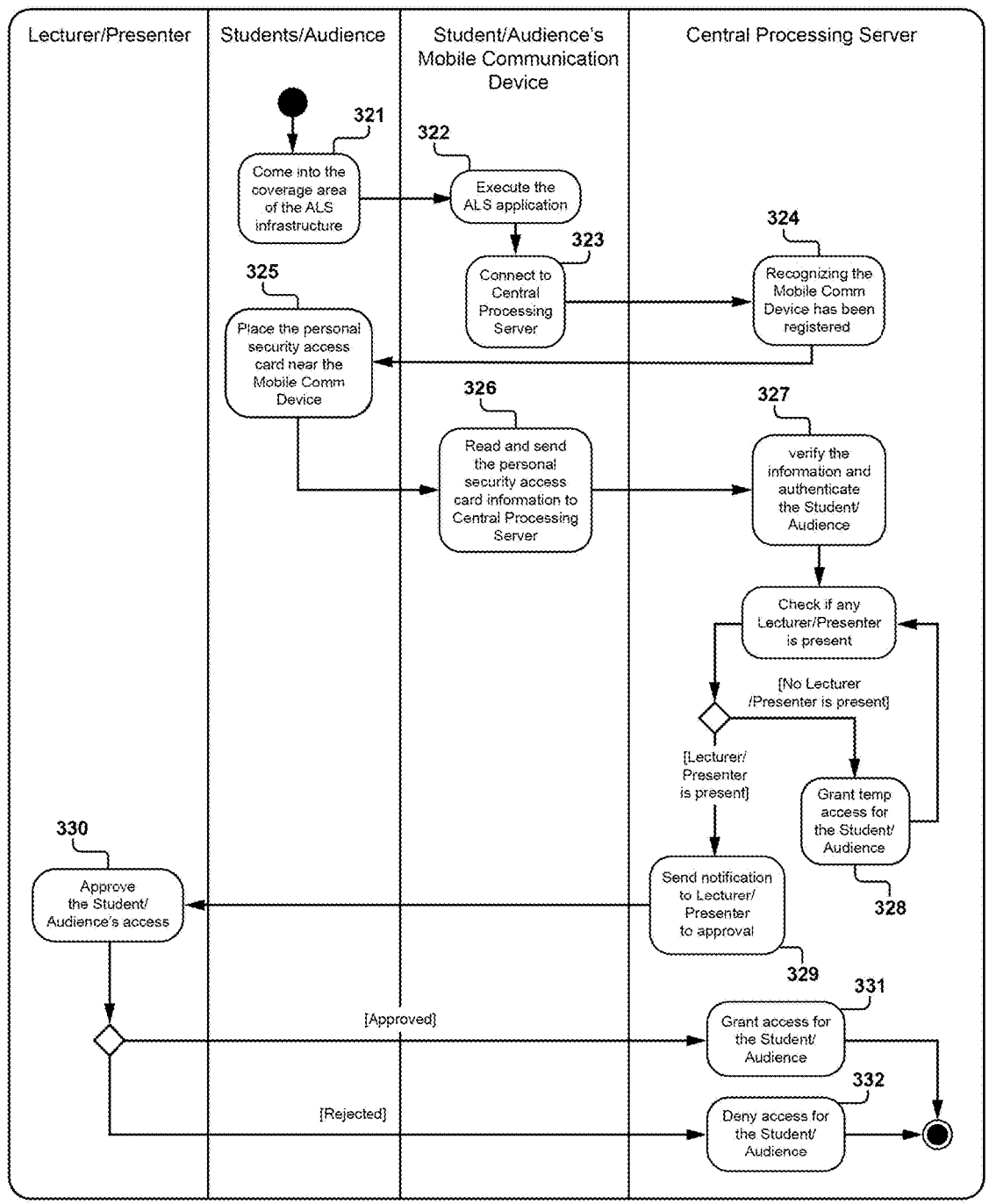

Referring to FIG. 3B. The participant authentication and joining of a mobile computing device to an ALS infrastructure for a participant in the student or audience group comprises: 321.) the mobile computing device coming into the coverage area of the ALS infrastructure; 322.) launching and executing the ALS application in the mobile computing device; 323.) the mobile computing device running the ALS application connecting to the ALS infrastructure; 324.) a first processing server in the ALS infrastructure recognizing the mobile computing device has been registered and instructing the mobile computing device to prompt its participant for authentication; 325.) the participant places his/her NFC-enabled personal security access card near the mobile computing device for retrieving the participant's personal security access information from the personal security access card; 326.) the mobile computing device sending the participant's personal security access information to the first processing server for authentication; 327.) upon a positive authentication, if no participant from a lecturer or presenter group has joined the ALS infrastructure, 328.) the mobile computing device joins the ALS infrastructure on a temporary basis, when participant from the lecturer or presenter group joins the ALS infrastructure, 329.) the first processing server sends a notification to his/her mobile computing device requesting his/her approval of the mobile computing device of the participant from the student or audience group joining the ALS infrastructure; if at least one participant from a lecturer or presenter group has joined the ALS infrastructure, 329.) a notification is sent to the mobile computing device of the participant from the lecturer or presenter group requesting the participant from a lecturer or presenter group to approve of the mobile computing device of the participant from the student or audience group joining the ALS infrastructure. If the participant from the lecturer or presenter group rejects the request, 332.) the mobile computing device of the participant from the student or audience group is refused from participation in the interactive lecture or presentation session in the ALS infrastructure and denied access to any networked resource in the ALS infrastructure; otherwise 331.) the mobile computing device joins the ALS infrastructure.

Classroom or Presentation Hall Management:

In accordance to one embodiment of the presently claimed invention, participants in an ALS infrastructure of a classroom or presentation hall are divided into two groups: lecturer or presenter group and student or audience group. Through a ALS application user interface running in the mobile computing device, a participant from the lecturer or presenter group can control and monitor individually and collectively the mobile computing devices of the participants from the student or audience group. Status of the mobile computing devices that can be monitored include: sleep mode on/off, battery level, volume, download progress of interactive multimedia contents and lecture or presentation materials, contents being displayed on the mobile computing devices, and whether the mobile computing devices are locked/unlocked from participant operation. Functions of the mobile computing devices that can be controlled include: sleep mode on/off, volume, lock/unlock from participant operation, download and playback of interactive multimedia contents and lecture or presentation materials, sharing of the contents being displayed on any mobile computing device with any other mobile computing device and/or any of the electronic audio and video equipment.

Exemplary Interactive Multimedia Contents and Their Playback in the Classroom or Presentation Hall:

1.) Literature Composition:

A participant in the lecturer or presenter group, by commanding through and providing user input to the ALS application user interface running in his/her mobile computing device, can create sub-groups of participants for the student or audience group for a group participation or competition in a lecture session on literature composition. The participant in the lecturer or presenter group can select the members for each sub-group and optionally a leader for each sub-group. Parts or streams of an interactive multimedia contents are fed to the mobile computing devices of the participants in the student or audience group. Each sub-group can receive the same or different parts or streams of the interactive multimedia contents. This can be controlled and monitored by the participant in the lecturer or presenter group through the ALS application user interface running in his/her mobile computing device. The ALS application user interface running in the mobile computing device of each participant in each sub-group in the student or audience group displays the respective parts or streams of the interactive multimedia contents and provides a text input area for the participant to enter his/her text composition related to or inspired by the respective parts or streams of the interactive multimedia contents. Each participant's text composition is shown simultaneously in the ALS application user interface running in the mobile computing devices of other participants in the sub-group. The final text composition is resulted from combining the individual text compositions of each participant in the sub-group. The final text compositions from each sub-group are then sent to the mobile computing device of the participant in the lecturer or presenter group for review. The participant in the lecturer or presenter group can choose to display all final text compositions in all of the mobile computing devices and/or in one or more of the electronic video and audio equipment, such as an overhead projector, by commanding through the ALS application user interface running in the mobile computing device of the participant in the lecturer or presenter group.

2.) In Session Questions and Answers:

The interactive multimedia contents can include one or more video clips, images, sound bits, and/or combination thereof; accompanied by a series of questions and possible answers. A participant in the lecturer or presenter group, by commanding through and providing user input to the ALS application user interface running in his/her mobile computing device, starts a video clips, images, and/or sound bits download and playback in all of mobile computing devices of participants in the student or audience group for a question-and-answer session. The corresponding questions are being displayed along side with the video clips, images, and/or sound bits. The questions shown can be multiple-choice questions with their corresponding selections of possible answers. The participant in the lecturer or presenter group can control the pace of the playback of the video clips, images, and/or sound bits, and lengths of time for answering the questions. Each student or audience enters his/her answer to each question in the ALS application user interface running in his/her mobile computing device. The answers from each student or audience are sent to the mobile computing device of the participant in the lecturer or presenter group for review. After the questions and answers session is concluded, statistics relating to the performance of the students or audiences, such as the percentage of corrected answers for each question, the number of corrected answers for each student or audience, answering time for each question and for each student or audience, and the number of student or audience who made certain answer selections on each question, are computed and made available for review in all of the mobile computing devices and/or one or more of the electronic video and audio equipment, such as an overhead projector, by commanding through the ALS application user interface running in the mobile computing device of the participant in the lecturer or presenter group.

3.) E-Textbook Playback:

The interactive multimedia contents can include one or more interactive video clips, images, text, and/or combination thereof in the format of a textbook having multiple sections and/or chapters. A participant in the lecturer or presenter group, by commanding through and providing user input to the ALS application user interface running in his/her mobile computing device, starts the interactive multimedia contents download and playback in all of mobile computing devices of participants in the student or audience group and/or one or more of the electronic video and audio equipment, such as an overhead projector. The participant in the lecturer or presenter group can select and control the pace of the playback of the sections and/or chapters in the mobile computing device of each student or audience. Alternatively, the participant in the lecturer or presenter group can also surrender all or part of the selection and control of the playback of the sections and/or chapters to the students or audiences.

4.) Voting:

The interactive multimedia contents can include one or more interactive video clips, images, text, and/or combination thereof in the format of a series of sets of selectable items. A participant in the lecturer or presenter group, by commanding through and providing user input to the ALS application user interface running in his/her mobile computing device, starts the interactive multimedia contents download and playback in all of mobile computing devices of the participants in the student or audience group and/or one or more of the electronic video and audio equipment, such as an overhead projector. The participant in the lecturer or presenter group can select and control the pace of the playback of the sets of selectable items in the mobile computing device of each student or audience. Alternatively, the participant in the lecturer or presenter group can also surrender all or part of the selection and control of the playback of the sets of selectable items to the students or audiences. Each student or audience casts his/her vote on the selectable items in each set of selectable items in the ALS application user interface running in his/her mobile computing device. After the voting session is concluded, statistics of the overall vote of the students or audiences on each set of selectable items are computed and made available for review in all of the mobile computing devices and/or one or more of the electronic video and audio equipment, such as an overhead projector, by commanding through the ALS application user interface running in the mobile computing device of the participant in the lecturer or presenter group.

Examples of Interactive Lectures and Curriculums are Illustrated Below with the Aid of Figures:

EXAMPLE 1—CONTEST FOR QUESTIONS WITH FASTEST RESPONSE

Figure 4:
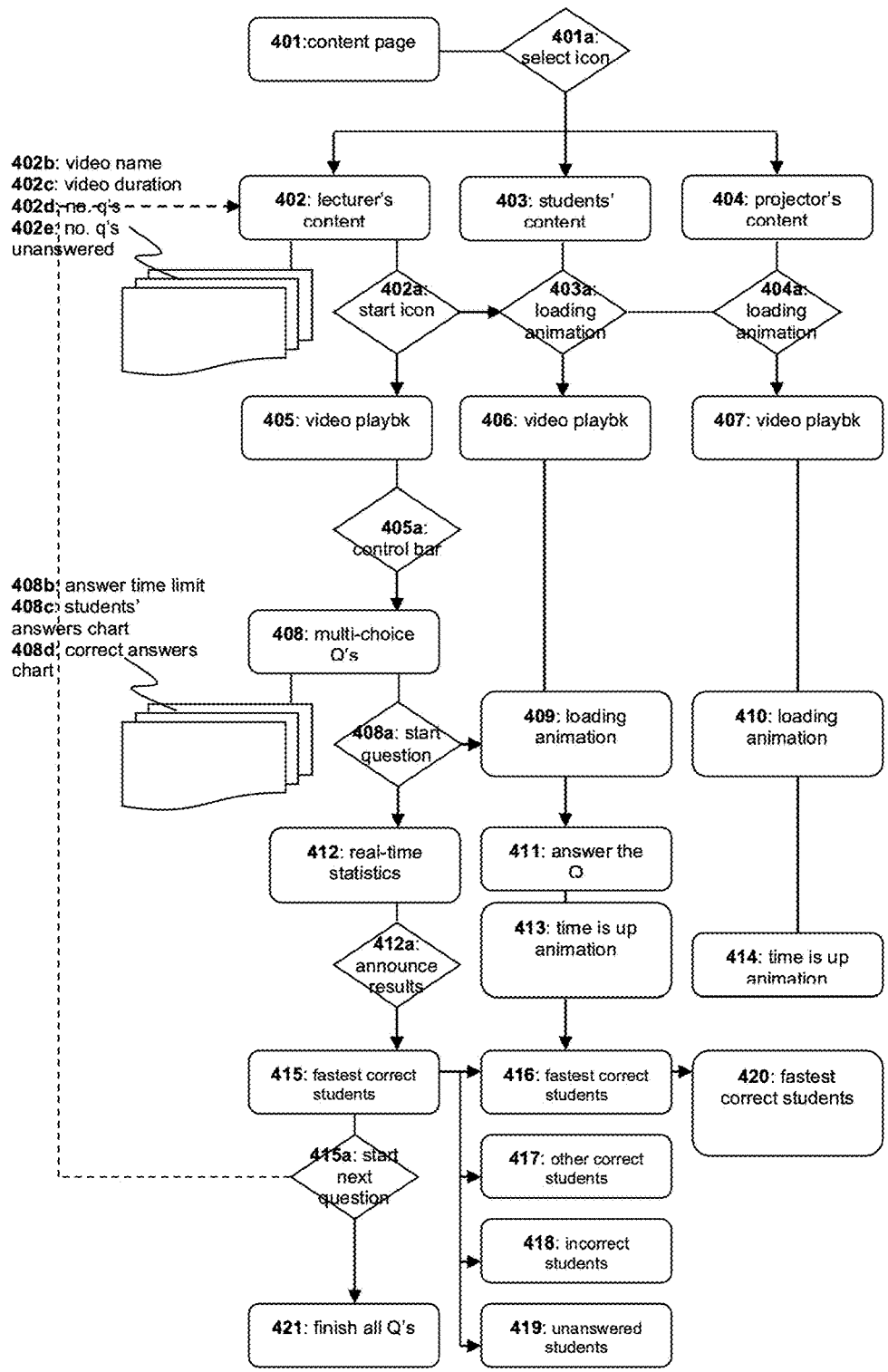
FIG. 4 is a flow chart illustrating how the interactive multimedia content pages for a contest for questions with the fastest response are loaded in different devices and the interaction thereof according to one embodiment of the presently claimed classroom interactive learning system.

In FIG. 4, the lecturer launches an in-class quiz or questions by first showing a short video relating to the lecture via the lecturer's mobile computing device. When lecturer retrieves the relevant interactive multimedia content, a content page 401 is popped up on lecturer's mobile computing device and an icon 401a is present on the content page 401. By selecting the icon 401a, it will bring the lecturer and students to two different content pages (402 and 403), as shown on their mobile computing devices respectively, and the same content is simultaneously projected to the screen by an overhead projector (404). Icon 401b functions as "back to index" and by selecting icon 401c the lecturer will be brought to control panel and activity checklist function bars after clicking on it. Steps 402 and 403 proceed simultaneously in the lecturer's mobile computing device and the students' mobile computing devices. In step 402, information of the video content can be found such as the name of the video 402b, time duration of the video 402c, total number of questions to be answered in the video 402d, and the number of questions remains unanswered 402e. By clicking on icon 402a, it brings the lecturer and the students to the video playback pages 405 and 406 respectively. In step 403, the page presented on the students' mobile computing devices has an animation 403a. The animation 403a remains in waiting mode until the lecturer clicks the icon 402a to start the short video of the contest. Once the lecturer clicks the icon 402a, the animation 403a will go to counting mode where a clock-like animation will start to count down while the short video to be played is being loaded. After the loading of the short video is finished, the content page in student's mobile computing device will start the streaming of the short video (406). Simultaneously, the same animation 404a will be projected to the screen by the overhead projector (404) and after loading the short video, the same content page as shown in step 406 will be projected to the screen in step 407 simultaneously. At the same time, the lecturer's mobile computing device will go to the same content page 405 but with a control bar 405a, which allows the lecturer to control the time of playback, volume, and the screen size of the video shown on the display of lecturer's mobile computing device. Any changes made on the video using the control bar 405a by the lecturer will be synchronized with the video being played in students' mobile computing devices and on the screen from the overhead projector. After the video is played, the video page in the lecturer's mobile computing device will automatically jump to a multiple choice question page (408). An icon 408a is for initiating the question once it is selected by the lecturer. The multiple choice page also contains other information such as the time limit for answering 408b which can be adjusted by the lecturer before initiating the question, a chart for showing the number of participants choosing each of the available choices 408c, and the correct answer of that question 408d. Once the icon for initiating the question 408a is selected, the answer page with multiple choices will be loading, and a waiting animation will be popped up on the display of student's mobile computing device (409) and on the screen by the overhead projector (410) before the answer page is successfully loaded. Each student can select his/her answer within the time limit for answering as shown on the answer page (411) in his/her mobile computing device. A real-time statistic for the number of participants choosing each answer and the number of participants unanswered will be shown on the display of the lecturer's mobile computing device (412). The icon 408b for initiating the question in 408 is automatically changed into an icon 412a for announcing the result when the answer page starts 412. Once the time for answering the question is up, a message informing the time is up will be popped up on the display of the students' mobile computing devices (413). An animation showing the time is up will also be popped up on the screen by the projector simultaneously (414). If the icon for announcing the result is selected by the lecturer, the first fastest three who answer correctly will be shown on the lecturer's mobile computing device (415); only the first fastest three who answers correctly will receive a content page 416 which informs the first fastest three each of their ranking, the time used for answering the question, and their respective scores in that question; for others who answers correctly after the first fastest three will receive a content page 417 informing that their answers are correct with the time they used respectively for answering the question and their respective scores in that question; for those answering incorrectly will receive a content page 418 informing that their answer is incorrect, the time they used respectively for answering the question and the correct answer; for those unanswered will receive a content page 419 informing that the time is up and what the correct answer is. Simultaneously, the name of the first three fastest, their respective time used for answering the question, their scores, the number of participants choosing each answer will be shown on the screen by the overhead projector (420). The advantages of this contest over other conventional multimedia lectures include synchronizing video playback in all mobile computing devices, real-time question/answer system with substantially no time lapse, immediate review of individual's result and ranking by the participant, and immediate statistics of student result. If that question is followed by another question, an icon 415a for initiating the next question will be available on the page (415). After selecting the icon 415a by the lecturer, the next question will be loaded. If that question is the last question in the contest, the icon 415a will be changed into an icon "Finish" for closing the contest and it automatically brings lecturer back to the first content page of the contest after selecting the "Finish" icon 421. Lecturer can choose to review the overall scores of the participants by launching the control panel after selecting icon 401c and decide whether to project the content under review on the screen by the overhead projector. Lecturer can also check the statistic of students' individual or overall performance for each question according to different layouts under the control panel. On the other hand, each student can only check the number of correctly answered questions versus the total number of questions he/she has answered and the total scores from the correctly answers under the control panel function.

EXAMPLE 2—SENTENCE COMPOSITION

Figure 5:
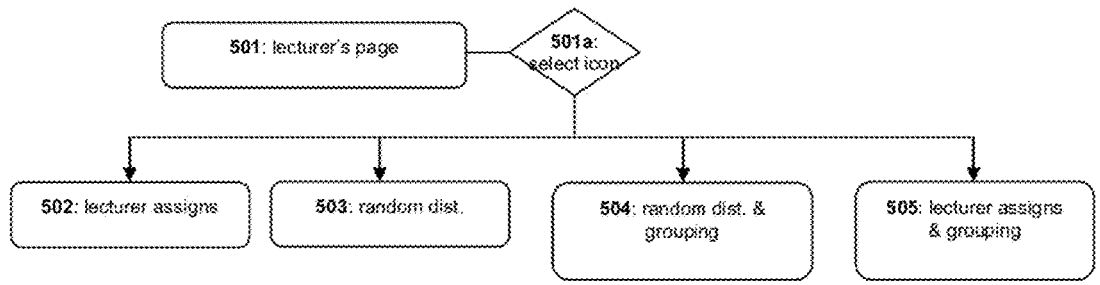
FIG. 5 is a flow chart illustrating how the interactive multimedia contents for a game to learn sentence composition are segmented and assigned to different participating students according to one embodiment of the presently claimed classroom interactive learning system.

In FIG. 5, a sentence composition game and its related interactive multimedia contents are retrieved by and playback at the lecturer's mobile computing device (501). Basically, each sentence is segmented into different segments and each segment is assigned with a segment number. Each segment may contain one or more than one words. A student or a group of students will be assigned to put different segments of the sentence in a correct order. In the content page 501, after selecting an icon "sentence composition" 501a, it will bring the lecturer to a game mode selection page where there are at least four modes for the lecturer to choose. One of the at least four modes of sentence composition is to assign one of the segments of a sentence to a particular student (502). Both participating and non-participating students in this game will be shown in a panel view where their photos, names and student numbers according to the sitting plan in the classroom will be displayed. Available segments of a sentence to be assigned to a particular student or group of students will be shown as icons on the same page where the lecturer can drag one of the segments along to the tile of a particular student. Once that student is assigned with one of the segments of a sentence, the respective tile showing that student's photo, name and student number will turn into green color in the panel, representing the status of being assigned. In another mode of this game (503), lecturer can select more than one segment of a sentence at one time by using two fingers pointing on the selection panel of the segments followed by dragging the selected segments on to the panel. Those students not having been assigned with any segment yet will be randomly distributed with one of the selected segments after the two fingers move away from the touching screen. In yet another mode of this game (504), different segments of the sentence are randomly distributed to the participating students and each student is assigned with a color for grouping purpose. In a further mode of this game (505), lecturer distributes each segment to each particular student and assigns group to each student. By combining with and arranging the order of different segments received by other students within his/her group, a complete sentence can be formed. It is the task for the students to interact with his/her classmates within his/her group to form the sentence by rearranging their positions.

EXAMPLE 3—"Who is Larger"

Figure 6:
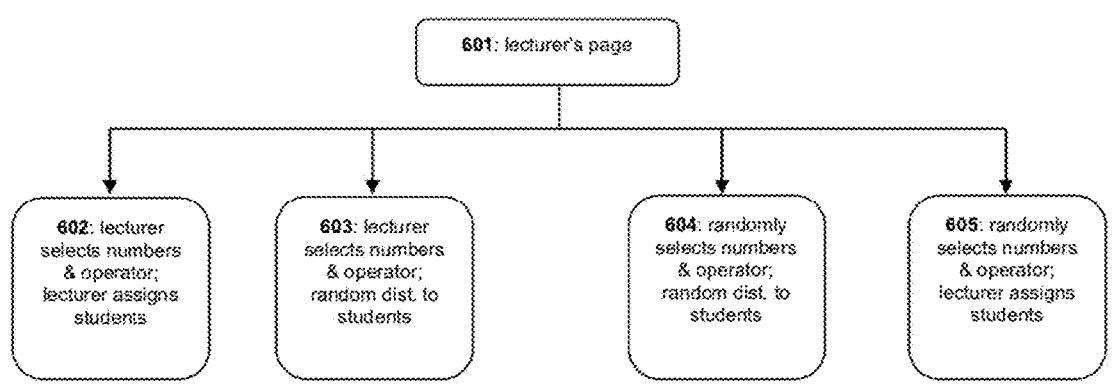
FIG. 6 is a flow chart illustrating how the interactive multimedia contents for a game to learn rearranging different numbers in order with comparison operators are assigned to different participating students according to one embodiment of the presently claimed invention.

In FIG. 6, a game for arranging at least two different numbers with a comparison operator ('>' or, '<') and its interactive multimedia contents are retrieved by and playback at the lecturer's mobile computing device (601). The lecturer distributes different numbers and comparison operator set including two random real numbers and a comparison operator ('>' or, '<') to each group of three students. Within each group, each student will receive either one of the two numbers or the comparison operator. The numbers and comparison operators are shown on the students' mobile computing devices. There are at least four game modes: one mode is to assign one student with either one of the two numbers, followed by assigning another student with another number and a third student with a comparison operator (602); another mode is to drag a group of two numbers plus a comparison operator to a panel by using two fingers first touching on the group selection bar and dragging the selected group onto the panel showing students' photo, name and student numbers (603). In such way, each of those not having been assigned with either one of the numbers or comparison operator will be randomly assigned with either one of the two numbers or a comparison operator from the selected group; a yet another mode is to randomly distribute either one of the two numbers or a comparison operator (604). In the case where the total number of participating students is not a multiple of 3, the remaining student/students will be shown as "not assigned" status on the panel; a further mode is to distribute either one of the two numbers or a comparison operator from a group to three designated students by lecturer (605). By combining with and arranging the order the numbers and comparison operators received by the students within each group, a complete mathematical statement can be formed. It is the task for the students to interact with his/her classmates within his/her group to form the correct mathematical statement by rearranging their positions.

EXAMPLE 4—COMPASS POINT GAME

Figure 7A:
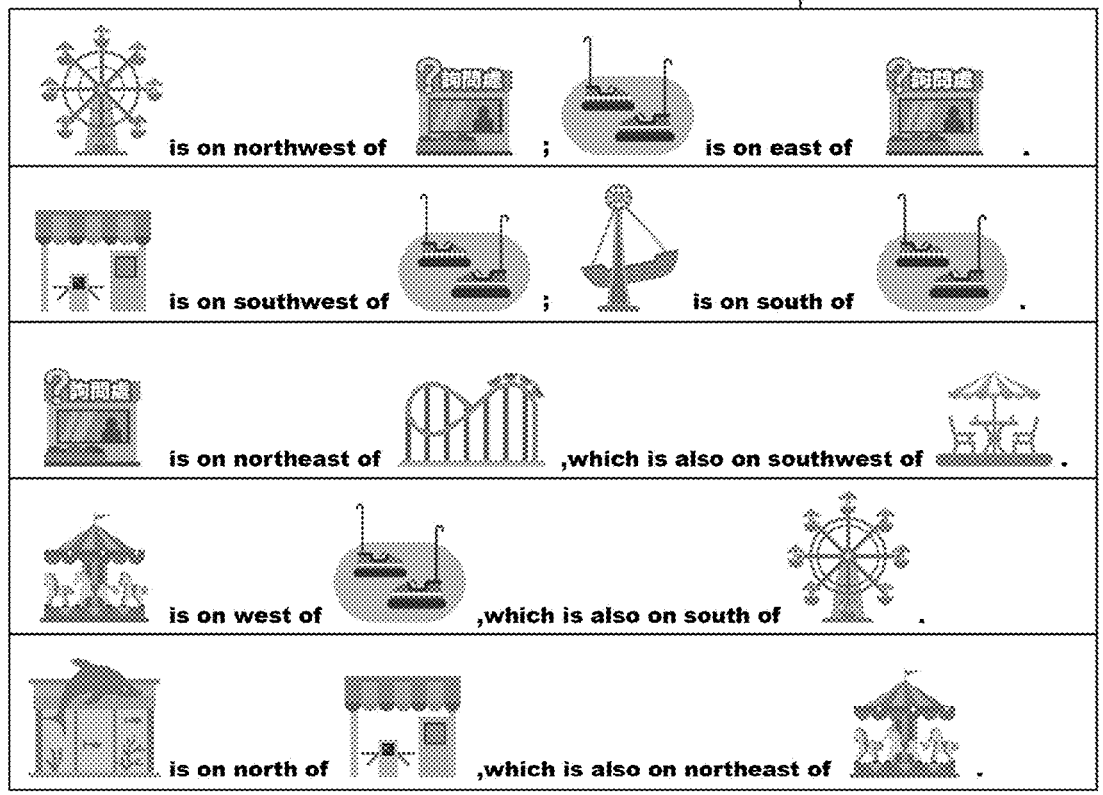
FIG. 7A shows a schematic diagram and interface of a game for learning navigation skills using compass point according to one embodiment of the presently claimed invention.
Figure 7A:
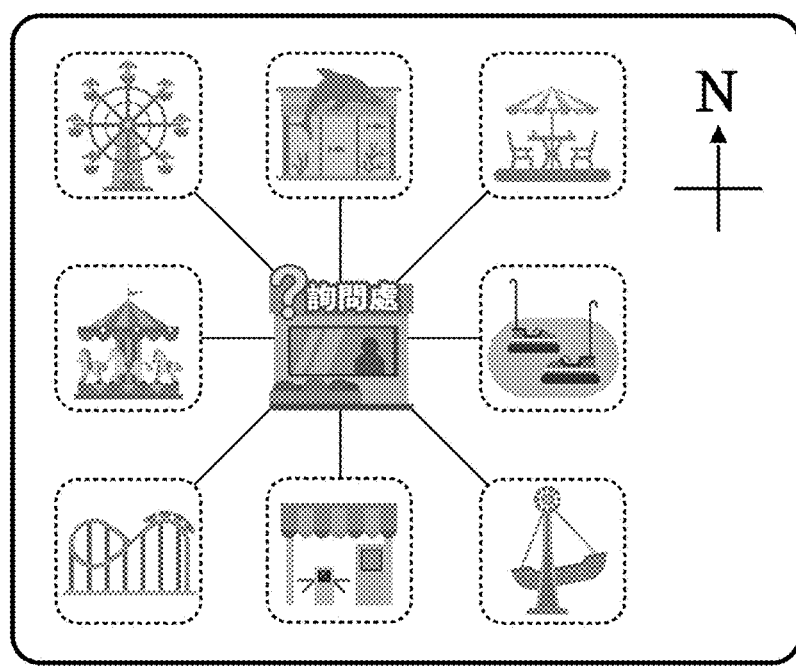
Figure 7B:
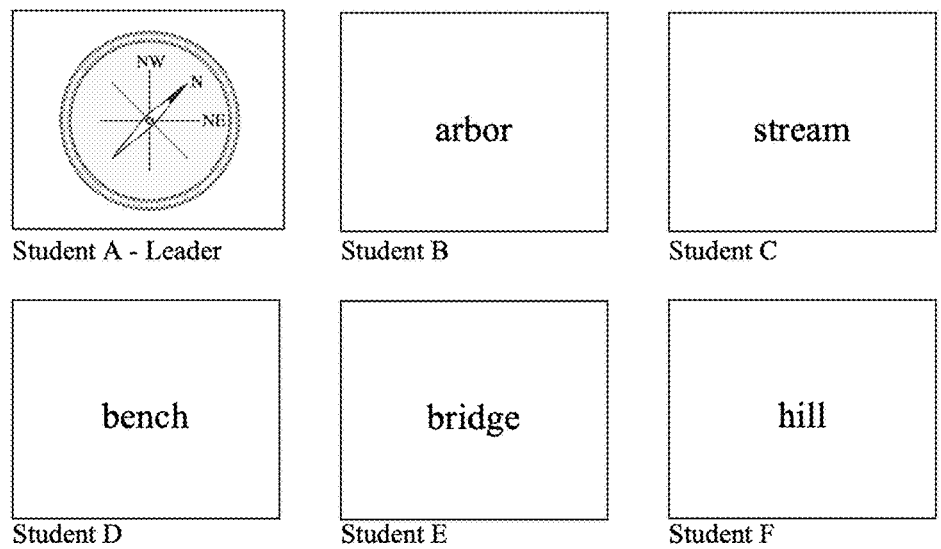
FIG. 7B shows a schematic diagram of how the information about another game for learning navigation skills is distributed among the participating students within the same group according to one embodiment of the presently claimed invention.

In FIGS. 7A and 7B, it is provided a game for students to learn how to determine directions using compass point, where the game includes two parts namely "Playground" and "Orienteering". In FIG. 7A, the part called "Playground" is designed for a group of ten students. The leader of each group is provided with an instruction card while the rest of the group members are distributed with nine pictures of playground facilitates. Each group should follow the instruction card 701 to put the right picture in a 3×3 square matrix surrounding a particular picture of a playground facility in the center of the square matrix 702. For example, an instruction card 701 provides five instructions, and each of the instructions gives at least one directional relationship among the facilities as mentioned in the instruction. In FIG. 7B, another part of the game called "Orienteering" is designed for a group of six students. The leader (Student A) of each group is provided with a virtual compass map while the rest of the group members (Students B-F) are distributed with five pictures of different facilities. In this part, the North pointer of compass bar in the compass map can either be at 12 o'clock position or at other position. Similar to the presentation format of the instruction card in "Playground", students can determine the directional relationship among different facilities based on the position of the leader in the classroom having the virtual compass map and position of the group members in the classroom having the pictures of the facilities.

EXAMPLE 5—CONTEST FOR COMPASS POINTS WITH FASTEST RESPONSE

Figure 8:
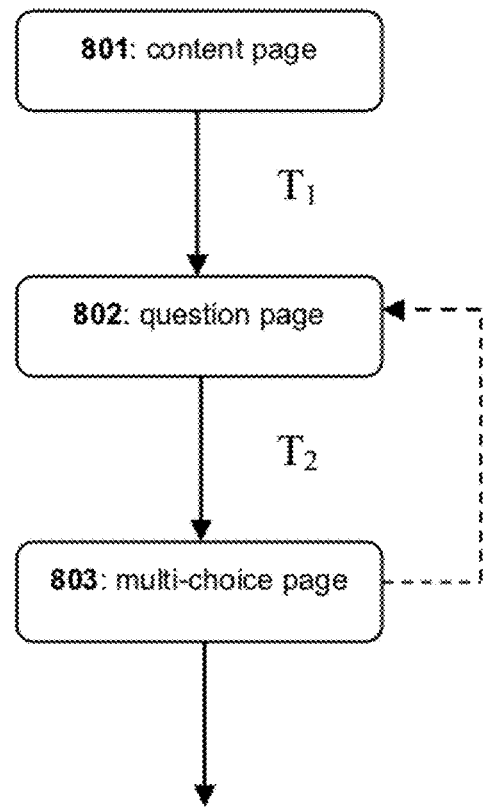
FIG. 8 shows an interface of a contest for questions about navigation with the fastest response according to one embodiment of the presently claimed invention.

Similar to Example 1, the contest of this example contains a series of multiple-choice questions with content related to the direction of different objects. Within a response time set for each question, participating students can choose one of the answers available. Real-time statistic in terms of the number of respondents for each question can be reviewed by the lecturer. Individual performance for each question and overall performance in the whole contest can be reviewed by the lecturer while the student can only receive a message whether his/her answer is correct and ranking of the time spent on that particular question until the contest is finished such that the student can further review his/her overall result in the contest such as the number of correct answers, scores relative to correct answer(s) made and the ranking among the participating students. In FIG. 8, a content page 801 with a graphic having a number of objects is shown on the display of the lecturer's and students' mobile computing devices. The same content page will also be shown on the screen by the projector. After a preset time duration $T_1$ (e.g. 3 seconds), the content page 801 will automatically jump to a question page 802. After another preset time duration $T_2$ (e.g. 4 seconds), the question page 802 will automatically jump to a multiple choice page 803. Similar to Example 1, after the time limit for answering, the correct answer will be popped up on students' mobile computing devices and on the screen by the projector. Real-time statistics for each question will be available to the lecturer during count-down of the multiple choice page 803. After-quiz statistics will also be available to both lecturer and students as different sets of the statistical data. Each student can only review his/her own result for each question or his/her overall number of correct answers, time spent on each question, the score in each question, and the overall score. The fastest three students with the correct answer for each question will be awarded with higher scores while the rest of students answering correctly within the time limit will be awarded with a minimum score. Lecturer can assess the individual's and overall class performance from the statistics.

EXAMPLE 6—COLORED 3-D FOLDING PAPERS EXERCISE AND CONTEST

Figure 9:
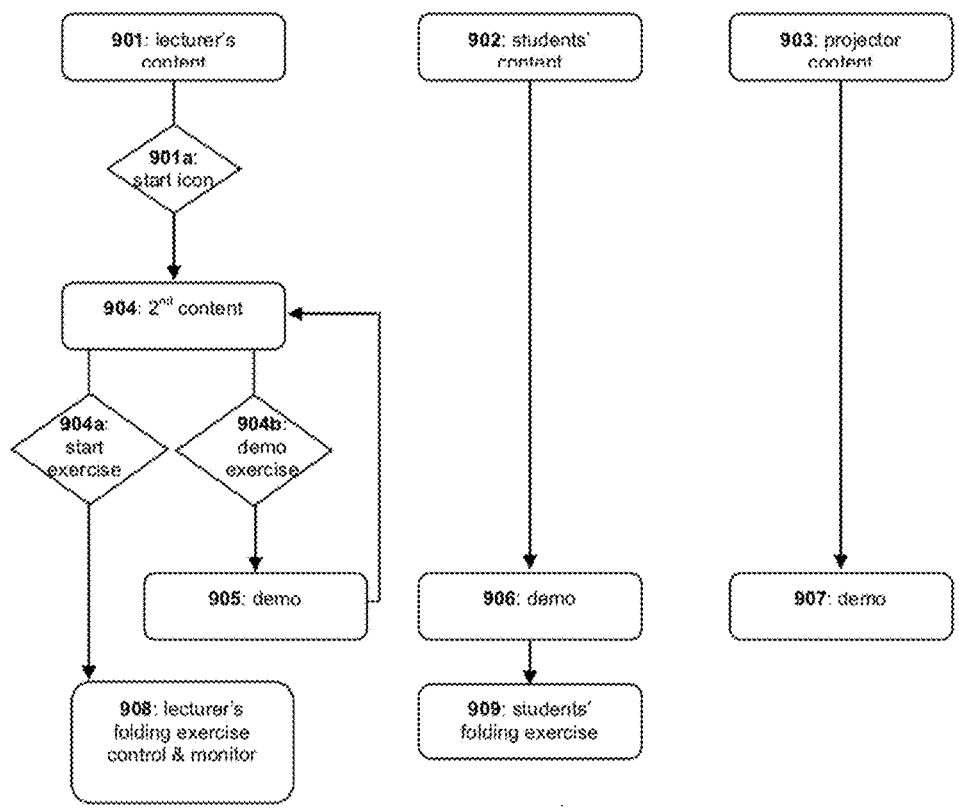
FIG. 9 is a flow chart illustrating how a game for learning 3-D structure is demonstrated and played with different unfolded paper templates according to one embodiment of the presently claimed invention.

In FIG. 9, the lecturer initiates and retrieves the interactive multimedia content of this exercise by using his/her mobile computing device. Students who have logged into the ALS infrastructure can also access the interactive multimedia content of this exercise by using their mobile computing devices. Once the content is successfully loaded into the lecturer's and the students' mobile computing devices, a first content page 901 with a "Start" icon (901*a*) will be popped up. Lecturer can select the icon 901*a* to initiate the exercise. The same content page will also be popped up on students' mobile computing devices and on the screen in the classroom by the projector (902 and 903). After selecting icon 901*a*, the content page 901 will jump to second content page 904 where the lecturer first has to choose an unfolded paper sample from a library containing different paper samples for folding into different 3-D structures. After choosing an unfolded paper sample, there are two commands for the lecturer to choose from. One of the commands is to start the exercise 904*a* and another is to demonstrate how the exercise can be done 904*b*. If the lecturer opts to demonstrate by selecting the icon 904*b*, a demonstration page 905 will be popped up on lecturer's mobile computing device while the same demonstration page will be synchronized on students' mobile computing devices and on the screen by the projector (906 and 907). In the demonstration page 905, lecturer can use different colors to fill in different segments of the unfolded paper sample for easy identification of which segment corresponds to which surface of the 3-D structure to be formed after folding. Filled color can be re-selected before an icon for initiating the folding 905*a* is selected. After the icon 905*a* is selected, the unfolded paper sample will be folded into the desired 3-D structure automatically. By using a pointer (e.g., mouse) or finger touch on a touch screen of his/her mobile computing device, the lecturer can tilt and rotate the folded 3-D structure in different directions along three different axes. Similar to what lecturer is capable of manipulating the unfolded paper sample, once the lecturer chooses the command to start the exercise 904*a*, the students can learn which segment of the unfolded paper sample corresponds to which surface of the 3-D structure after folding 908. After the 3-D structure is formed, the students can also tilt and rotate the 3-D structure from one perspective view to another perspective view by using a pointer (e.g. mouse) or finger touch on the touch screens of their mobile computing devices in order to see those surfaces that cannot be seen in the first perspective view 909. Besides the learning exercise, a quiz for testing the knowledge of students in 3-D structure construction from an unfolding paper sample is further provided. In one of the examples of the quiz, a series of different perspective views of a 3-D structure having different colors filled into different surfaces is provided by the lecturer for students to determine which color should be filled into which segment of the unfolded paper sample such that the color filled into each segment of the unfolded paper sample should match the color of the corresponding segment of the 3-D structure provided by the lecturer. Alternatively, color can be changed into other indicator such as animal character to be filled into each segment of the unfolded paper sample. This exercise can be an individual or group exercise. In the case of being a group exercise, lecturer can choose how to group the students and how to distribute different objects to each member of the group according to any of the foregoing examples.

EXAMPLE 7—CAPACITY AND VOLUME CALCULATION EXERCISE AND CONTEST

Figure 10:
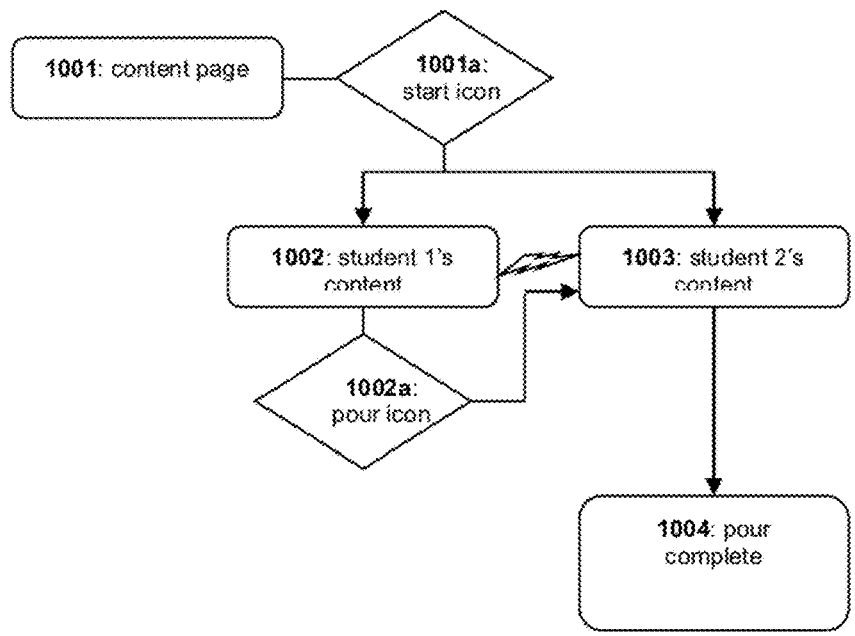
FIG. 10 is a flow chart illustrating how an exercise for learning calculation of capacity and volume is carried out and the interaction thereof according to one embodiment of the presently claimed invention.

In FIG. 10, the lecturer initiates and retrieves the interactive multimedia content of this exercise by using his/her mobile computing device. Students who have logged into the ALS infrastructure can also access the interactive multimedia content of this exercise by using their mobile computing devices. Once the content is successfully loaded to the lecturer's and the students' mobile computing devices, a first content page 1001 with an icon "Start" (1001*a*) will be popped up. The lecturer can select the icon 1001*a* to initiate the exercise. Each pair of playing cards showing an empty container with measurement marks and a volume of a liquid will be either randomly or selectively distributed to two of the participating students. The two students who have received the pair of playing cards will be presented with two different content pages (1002 and 1003). During the exercise, two students' mobile computing devices are communicated with each other according to the data of the interactive media content being exchanged between the two students' mobile computing devices. In the content page 1002, a bottle of liquid is shown on the display of the first student's mobile computing device. An icon 1002*a* for the first student to pour the liquid out of the bottle is available for selection. Once the icon 1002*a* is selected, the student can tilt his/her mobile computing device to one side (either left or right) until a threshold of the tilting angle against the horizontal plane is reached (e.g. 45°). The tilting motion of the student and the tilting angle can be sensed by a motion sensor (e.g. motion sensing accelerometer) or program pre-installed in the student's mobile computing device. Once the tilting angle reaches the threshold, an animation of pouring liquid from the bottle will be played on the first student's mobile computing device. In another content page 1003, an animation that the empty flask with measurement marks are being filled up with the pouring liquid from the bottle in 1002 will be played on the second student's mobile computing device when it receives a signal from the first student's mobile computing device through the processing server that the tilting angle of which has reached the threshold (e.g. 45°). The liquid being poured into the empty flask will stop when the pre-determined volume of the liquid is completely poured out of the bottle in 1002. When it happens, the liquid pouring animation in the content page 1002 will stop playing (which means the liquid is completely poured out of the bottle), and the content page 1002 will be automatically shut down and directed to a blank page in the first student's mobile computing device. At the same time, the animation of filling up the empty container by the liquid in 1003 will end (which means the liquid is completely poured into the empty flask). The first and second students can then work together or alone to calculate the volume of the liquid according to the measurement mark that the liquid reaches in the flask in 1003. Different measuring flasks can be assigned by lecturer in order to allow students to learn how to read measurement marks on different flasks and calculate the volume according to the level of liquid reaching in the flask.

EXAMPLE 8—DIFFERENT CROSS-SECTIONS OF OBJECT

This exercise is designed for a group of five to six students. Similar to other games, lecturer can group students and/or distribute different playing cards among students manually or randomly in this exercise. By default, the leader of each group will receive an animation of a container structure in various shape (e.g., cylinder, triangular prism, cubic) filled with virtual water. The rest of the group members will be distributed with different cross-sectional views. As in one of the exercises for learning volume and capacity measurement, a pre-installed motion sensor or sensing program in the student's mobile computing device is provided to sense the tilting motion and angle of the student's mobile computing device. When the leader tilts his/her mobile computing device to one side (e.g., left or right), a series of cross-sectional images can be captured by an image capturing module at certain degrees of tilting angle during the tilting of the mobile computing device (e.g., every 5°). The series of cross-sectional views of the container taken during the tilting of the mobile computing device will be distributed among the rest of the group members. Distribution of various cross-sectional views of the container among the students can be performed manually by the lecturer or randomly by the computing device. Group members can analyze the cross-sectional views to sequence them in order according to the tilting motion from vertical to horizontal position of the container. Alternatively, the object to be cross-sectioned can be in irregular shape such as food. Students can also be initially distributed with some cross-sectional view images from the library followed by being given an object in order to determine which of the images belong to the object assigned by the lecturer.

EXAMPLE 9—VISUAL ART SKILLS EXERCISE

Figure 11A:
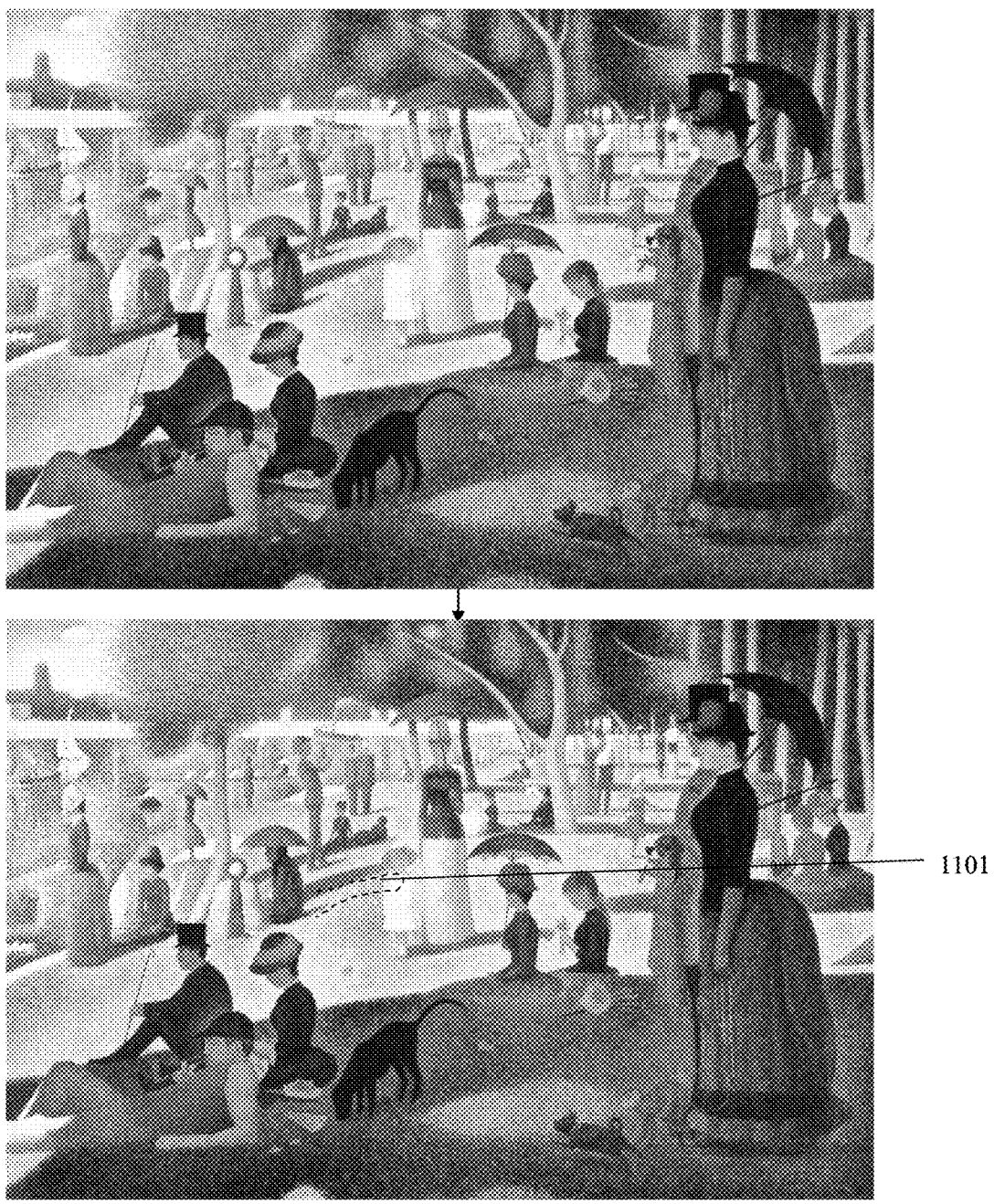
FIG. 11A shows a visual art skills exercise for finding shadow in a painting or photo.

This exercise can be divided into three parts. The first part of this exercise is called "finding shadow" (FIG. 11A), where a photo or painting is first loaded on lecturer's mobile computing device. After the photo or painting is loaded, the lecturer can demonstrate how to circle the shadow 1101 of the object in the photo or painting on his/her mobile computing device by using drawing tools available in the program. The lecturer can also use the same circle tool to identify shadows in different intensities in the photo or painting. The demonstration page will be synchronized with the students' mobile computing devices and the screen in the class by the overhead projector. After demonstration, the lecturer can select "start" icon to send a template of the photo or painting to student's mobile computing device through the server. The lecturer's further command to authorize the students to circle the shadow is required. Time is controlled by the lecturer and he/she can stop the program at certain period of time after the authorization to circle the shadow is sent. All the students' work during the controlled time will be sent to the lecturer's mobile computing device right after the program is stopped. The students' work can be previewed on lecturer's mobile computing device in a form of thumbnail. A particular student's work can be displayed on both lecturer's and the students' mobile computing devices while the same student's work can be synchronized on the screen by the overhead projector if the lecturer commands to show to all.

Figure 11B:
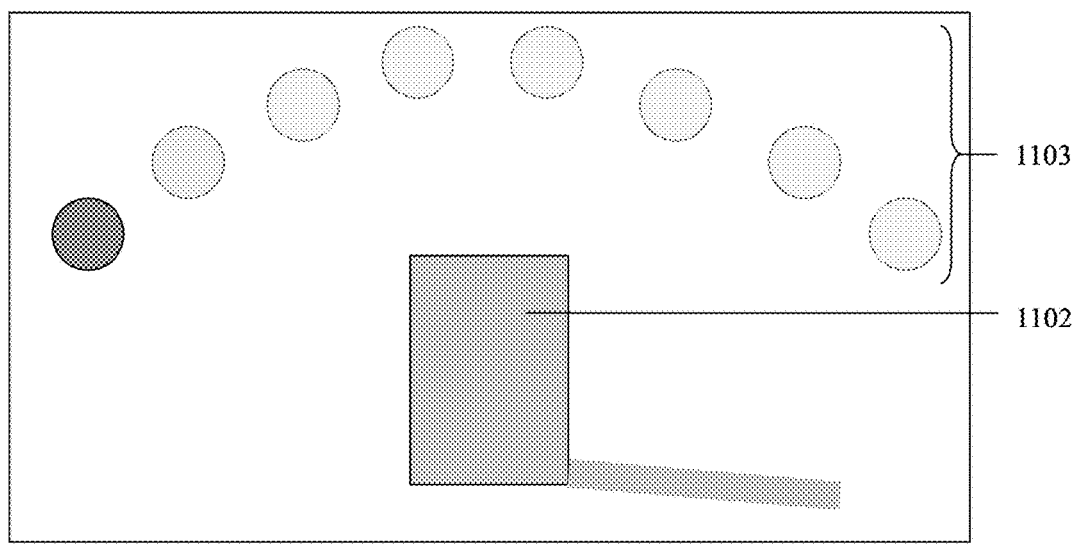
FIG. 11B shows another visual art skills exercise for learning the change in shadows of an object by selecting different light sources from different position.

In the second part of the visual art exercise, a computer graphic containing a 3-D object 1102 and various light sources from different directions 1103 is provided (FIG. 11B). The students can click or touch on each of the various light sources in order to learn the changes in shadow of the object under different light sources from different directions. Alternatively, the lecturer can group students as in one of the foregoing examples and distribute manually or randomly an object image and a shadow image to each of two students. The students should pair up themselves by searching for the matching object/shadow in the class.

In the third part of the visual art skills exercise, students are given a photo or painting at each time to learn how to outline an object in the photo/painting or even use different colors to paint the outlined object. The students can also add other effects to the object such as adding straight or irregular lines. Some of these effects can be found in a visual art library or from the Internet. Alternatively, students can freely draw on a paper template using the available drawing tools in the program. The lecturer has the authority of when and whether to share one student's work with other students on their mobile computing device and/or project the same to the screen through the overhead projector. Besides visual art effect, students can also incorporate other effects such as sound effect into the object. Background of the paper template can also be changed by using some background templates retrieved from a background template library or from the Internet; or created by the students and stored in the library.

It is yet another aspect of the presently claimed invention to provide a mobile computing device that integrates with the Cloud computing based ALS outside a classroom or a presentation hall and without the need of first registering the mobile computing device and joining the ALS infrastructure, allowing its user to access the content stored within the ALS Cloud computing processing server or the cluster of Cloud computing processing servers. The user's access to the content can be based on paid contents and/or metered usage. Features of such mobile computing device include a resource tray in its graphical user interface. The resource tray functionalities include a quick access to reference materials and hyperlinks to related resources on the Internet and those residing in the Cloud computing processing server or the cluster of Cloud computing processing servers of the Cloud computing based active learning system.

Beacon-Based Interactive Lectures and Curriculums:

Returning to FIGS. 1A and 1B. In accordance with one embodiment of the present invention, the active learning system includes a plurality of beacons 210 and 220, which belong to a class of Bluetooth low energy (BLE) devices. An ordinarily skilled person in the art can appreciate that other low cost wireless data transmission technologies, devices, and standards (i.e. Wi-Fi, RFID, NFC, etc.) may also be adopted without deviating from the principle of the present invention. The beacons 210 and 220 can be used in conjunction with the participants' mobile computing devices, or the beacons can be used without the involvement of any mobile computing device. Certain beacon-based interactive lectures or curriculums are designed to use only beacons 210, 220 that are wearable on participants, installed at point of interests, or combinations thereof.

The goal of the beacon-based interactive lectures and curriculums is to integrate physical social activities with virtual interactive lectures or curriculums to enhance the overall learning experience of the participants. Through the use of the beacons, the active learning system enables a personalized physical and virtual social network between and within classrooms or presentation halls, home, and extracurricular sites. The coverage of the beacon-based interactive lectures and curriculums extends from education to other life aspects.

1.) Management of Group Excursion:

In a group excursion (i.e. a school outing), the attendance taking and tracking of students can be accomplished using wearable beacons 210. Each participating student is wearing a wearable beacon 210 with a unique identification. A guide or leader, by commanding through and providing user input to the ALS application user interface running in his/her mobile computing device, can take attendance of the participating students at any place and at anytime, such as when gathering at a pick up location or in transit. When the wearable beacons 210 on the participating students are within the proximity of the mobile computing device of the guide or leader, the ALS application running in the mobile computing device receives the wireless data signal transmission from the detected wearable beacons 210. The ALS application user interface displays the detected beacons' identifications with the pre-configured matching names of the participating students. Any missing student can easily be identified by comparing a pre-configured list of students who signed up for the excursion and the list of detectable beacons. Because the transmission of wireless data signal from the wearable beacons 210 is continuous throughout the excursion, the students' locations can be tracked by taking multiple attendances by the ALS application running in the mobile computing device of the guide or leader. With the mobile computing device connected to the ALS Cloud computing processing server or the cluster of Cloud computing processing servers, real-time attendance information of the students can be uploaded to the ALS Cloud computing processing server or the cluster of Cloud computing processing servers such that remote users (i.e. parents), by using the ALS application user interface running in his/her mobile computing device, can monitor the locations of the students.

2.) Delivery of Point-of-Interest Based Contents:

Location-based beacons 220 can be installed at or near point-of-interests, such as historical landmarks, event sites, and exhibition articles. When a participating student using his/her mobile computing device running the ALS application is positioned near a location-based beacon 220, the mobile computing device receives wirelessly the identification data of the location-based beacon 220. The ALS application processes the identification data and sends the information to the ALS Cloud computing processing server or the cluster of Cloud computing processing servers to retrieve a previously stored interactive media content associating with the point of interest. The interactive media content is sent back to the mobile computing device for display and playback, supplementing the physical activities pertaining to the point of interest. The interactive media content can also include game or educational instructions (i.e. directions and maps to the next point of interest). By sending the identification data of one or more of the location-based beacons 220 back the ALS Cloud computing processing server or the cluster of Cloud computing processing servers, the movement and progress of the student can be tracked for safety and assessment purposes.

In another embodiment, the function of the location-based beacons 220 can be served by Global Positional System (GPS) coordinates. For example, instead of receiving the identification data of the location-based beacons 220, the student's mobile computing device continuously receives GPS coordinates data wirelessly throughout his/her trip. The ALS application running in the mobile computing device processes the received GPS coordinates data processes and when a received GPS coordinate matches a pre-configured GPS coordinate of a point of interest, the mobile computing device sends the information to the ALS Cloud computing processing server or the cluster of Cloud computing processing servers to retrieve a previously stored interactive media content associating with the point of interest.

In another embodiment, it is not necessary for the students to carry their mobile computing devices. In this case, each participating student wears a wearable beacon 210 with a unique identification. When the participating student reaches a point of interest, the corresponding location-based beacon 220 acts as a receiver to receive the wireless data signal transmission from the participating student's wearable beacon 210. In this embodiment, the location-based beacons 220 are connected to the ALS Cloud computing processing server or the cluster of Cloud computing processing servers such that the location-based beacons 220 can send to the ALS Cloud computing processing server or the cluster of Cloud computing processing servers the identifications of the received wireless data signal transmission from the participating student's wearable beacon 210. This way, each participating student's itinerary during the excursion is recorded. When the participating student later accesses his/her mobile computing device running the ALS application, the ALS application can retrieve from the ALS Cloud computing processing server or the cluster of Cloud computing processing servers his/her itinerary of the excursion, along with the interactive media content associating with each point of interest visited for review and/or sharing. This way, the active learning experience is extended from the classrooms or presentation halls to extracurricular sites to home.

3.) Tracking Offline Activities:

With the use of wearable beacons 210 and location-based beacons 220, offline activities of a student can be tracked continuously. For example, location-based beacons 220 can be installed in a library, a music room, and a gymnasium. When the student checks in to one of the vicinities, the corresponding location-based beacon 220 acts as a receiver to receive the wireless data signal transmission from the student's wearable beacon 210, serving as a check-in notice. In this embodiment, the location-based beacons 220 are connected to the ALS Cloud computing processing server or the cluster of Cloud computing processing servers such that the location-based beacons 220 can send to the ALS Cloud computing processing server or the cluster of Cloud computing processing servers the identifications of the received wireless data signal transmission from the student's wearable beacon 210. Over a time period, the collected check-in notices form a statistical data pool on the student's behaviors. For example, the statistical data pool may show a pattern of time spent in the library, music room, and the gymnasium. This in turn helps teachers, school counselors, and parents in assessing the overall wellness and growth of the student.

The embodiments disclosed herein utilize embodiments of the mobile computing devices that include, but not limited to, tablet computers, laptop computers, Netbook computers, and/or combinations thereof that are wireless-networking enabled. In various embodiments, the mobile computing device comprises at least a computer processor that is configured to execute the ALS application and provide exclusively the ALS application user interface. As such, the mobile computing device is specifically purposed for the ALS application only and no other application. The computer processor is also configured to provide the data communication handling and coordination with the ALS Cloud computing processing server or the cluster of Cloud computing processing servers, between and among a group of multiple mobile computing devices such that the playback of interactive media contents and user interface actions are synchronized in the mobile computing devices in the group. This entails that when one mobile computing device is interrupted (i.e. lost network connectivity) in its playback of interactive media contents or user interface actions, other mobile computing devices in the synchronized group are signaled to stop and re-synchronized when the interrupted mobile computing device resumes. The mobile computing device further comprises an electronic touch display screen configured to display the ALS application user interface displays and receive user input; wide area wireless data communication system components that are compatible with industry standards such as Wi-Fi; short distance data communication system components that are compatible with industry standards such as Bluetooth and BLE; near-field communication (NFC) data communication system components; and GPS signal receiving system components.

The embodiments disclosed herein may be implemented using general purpose or specialized computing devices, computer processors, or electronic circuitries including but not limited to digital signal processors (DSP), application specific integrated circuits (ASIC), field programmable gate arrays (FPGA), and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

In some embodiments, the present invention includes computer storage media having computer instructions or software codes stored therein which can be used to program computers or microprocessors to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for conducting interactive learning session in a classroom or presentation in a presentation hall, comprising:

a first network infrastructure;

a first processing server connected to the first network infrastructure and configured to serve multimedia lecture or presentation material content data and exchange data from one or more mobile computing devices connected to the first network infrastructure;

the one or more mobile computing devices, each having a computer processor configured for receiving and displaying the multimedia lecture or presentation material content data, facilitating user input, and receiving the input data;

wherein each computer processor of the at least one mobile computing device adapted to be used by a lecturer or presenter is configured to provide a user interface to be used by lecturer or presenter;

and each computer processor of the two or more mobile computing devices adapted to be used by students or audience is configured to provide a user interface to be used by students or audience;

wherein the first processing server and the one or more mobile computing devices are interconnected via the first network infrastructure;

wherein the mobile computing device adapted to be used by the lecturer or presenter is further configured to control and monitor display, sound volume, power on/off, sleep mode on/off, interactive multimedia contents playback, access authorization to data in the first processing server, network resource access, network connectivity, volume, storage capacity, battery level, and general device conditions of each of the one or more mobile computing devices adapted to be used by students or audience;

wherein the mobile computing device adapted to be used by the lecturer or presenter is further configured to control and monitor the first network infrastructure, adjusting and segmenting connectivity coverage area of the first network infrastructure, enabling and disabling network connections and networked resource accesses of each of the one or more mobile computing devices adapted to be used by students or audience;

wherein the one or more mobile computing devices adapted to be used by students or audience being divided into two or more logical sub-groups of one or more mobile computing devices adapted to be used by students or audience according to user input received by the mobile computing device adapted to be used by the lecturer or presenter;

wherein the mobile computing device adapted to be used by the lecturer or presenter is further configured to control real-time delivery of one or more different parts of the multimedia lecture or presentation material content data to each of the one or more mobile computing devices adapted to be used by students or audience, and to control which one or more parts of the multimedia lecture or presentation material content data being delivered to each of the logical sub-groups;

wherein the one or more different parts of the multimedia lecture or presentation material content data are delivered to the one or more mobile computing devices simultaneously, enabling a real-time synchronized interactive lecture or presentation experience among the students or audience in the classroom or presentation hall;

wherein the multimedia lecture or presentation material content data is divided into the one or more different parts according to a pre-configured setting or user input received by the mobile computing device adapted to be used by the lecturer or presenter; and wherein each of the one or more mobile computing devices is further configured in to synchronize playback of content data and user interface action with the other one or more mobile computing devices such that when one of the mobile computing devices is interrupted in the playback of content data or user interface action, playback of content data or user interface action in the other mobile computing devices is stopped until the interruption is resolved.

2. The system of claim 1, further comprising one or more electronic audio and video equipment for receiving and displaying one or more different parts of the multimedia lecture or presentation material content data;

wherein the mobile computing device adapted to be used by the lecturer or presenter is further configured to control real-time delivery of one or more different parts of the multimedia lecture or presentation material content data to each of the audio and video equipment and to control which one or more parts of the multimedia lecture or presentation material content data being delivered to each of the audio and video equipment; and wherein the one or more different parts of the multimedia lecture or presentation material content data are delivered to the audio and video equipment simultaneously, enabling a real-time synchronized interactive lecture or presentation experience among the students or audience in the classroom or presentation hall.

3. The system of claim 1, further comprising:

a second network infrastructure; and a second processing server connected to the second network infrastructure and configured to store the multimedia lecture or presentation material content data to be retrieved by the first processing server also connected to the second network infrastructure.

4. The system of claim 1, wherein the mobile computing device adapted to be used by the lecturer or presenter is further configured to facilitate group participation or competition in a lecture session on literature composition for the students or audience;

wherein each of the logical sub-groups of the one or more mobile computing devices adapted to be used by students or audience receives one or more different parts of the multimedia lecture or presentation material content data;

wherein the mobile computing device adapted to be used by the lecturer or presenter is further configured to control which one or more parts of the multimedia lecture or presentation material content data being delivered to each of the logical sub-groups of the one or more mobile computing devices adapted to be used by students or audience;

wherein each of the one or more mobile computing devices adapted to be used by students or audience is further configured in their computer processors to receive input of a text composition, and to simultaneously and in real-time display a combined text composition of one or more input of text compositions received by one or more other the one or more mobile computing devices adapted to be used by students or audience within the same logical sub-group; and wherein the mobile computing device adapted to be used by the lecturer or presenter is further configured to receive and display the combined text composition of each logical sub-group of the one or more mobile computing devices adapted to be used by students or audience.

5. The system of claim 1, wherein the mobile computing device adapted to be used by the lecturer or presenter is further configured to facilitate participation or competition in a question-and-answer session for the students or audience;

wherein each of the one or more mobile computing devices adapted to be used by students or audience receives one or more different parts of the multimedia lecture or presentation material content data, wherein each part of the multimedia lecture or presentation material content data comprises at least one question;

wherein the mobile computing device adapted to be used by the lecturer or presenter is further configured to control which one or more parts of the multimedia lecture or presentation material content data being delivered to each of the one or more mobile computing devices adapted to be used by students or audience;

wherein each of the one or more mobile computing devices adapted to be used by students or audience is further configured in their computer processors to receive input of one or more answers to the one or more questions within the one or more parts of the multimedia lecture or presentation material content data received and displayed;

wherein the mobile computing device adapted to be used by the lecturer or presenter is further configured to receive and display the one or more answers received by the one or more mobile computing devices adapted to be used by students or audience; and wherein the mobile computing device adapted to be used by the lecturer or presenter is further configured to display performance statistics, wherein the performance statistics include a percentage of corrected answers for each question, number of corrected answers received from each of the one or more mobile computing devices adapted to be used by students or audience, answering time for each question for each of the one or more mobile computing devices adapted to be used by students or audience, and number of the one or more mobile computing devices adapted to be used by students or audience from which certain answer selections are received on each of the questions.

6. The system of claim 1, wherein the lecturer or presenter, by using the mobile computing device adapted to be used by the lecturer or presenter is further configured to facilitate a voting session for the students or audience;

wherein each of the one or more mobile computing devices adapted to be used by students or audience receives one or more different parts of the multimedia lecture or presentation material content data, wherein each part of the multimedia lecture or presentation material content data comprises a series of sets of selectable items;

wherein the mobile computing device adapted to be used by the lecturer or presenter is further configured to control which one or more parts of the multimedia lecture or presentation material content data being delivered to each of the one or more mobile computing devices adapted to be used by students or audience;

wherein each of the one or more mobile computing devices adapted to be used by students or audience is further configured in their computer processors to receive input of item selections for each of the sets of selectable items within the one or more parts of the multimedia lecture or presentation material content data received and displayed;

wherein the mobile computing device adapted to be used by the lecturer or presenter is further configured to receive and display the item selections for the sets of selectable items received by the one or more mobile computing devices adapted to be used by students or audience; and wherein the mobile computing device adapted to be used by the lecturer or presenter is further configured to display vote statistics.

7. The system of claim 1, wherein the mobile computing device adapted to be used by the lecturer or presenter is further configured to create and configure the logical sub-group division of the one or more mobile computing devices adapted to be used by students or audience.

8. The system of claim 1, wherein the mobile computing device adapted to be used by the lecturer or presenter is further configured to create and configure a leader for each of the logical sub-groups.

9. The system of claim 1, further comprising one or more location-based beacons each installed at or near a point-of-interest;

wherein the one or more mobile computing devices are further configured to receive data signal transmitted by the location-based beacons.

10. The system of claim 1, further comprising one or more wearable beacons each worn by a student or audience;

wherein the mobile computing device adapted to be used by the lecturer or presenter is further configured to receive data signal transmitted by the wearable beacons.

11. The system of claim 1, further comprising one or more location-based beacons each installed at or near a point-of-interest; and one or more wearable beacons each worn by a student or audience;

wherein the location-based beacons are configured to receive data signal transmitted by the wearable beacons.

* * * * *